United States Patent
Steudler, Jr.

(10) Patent No.: US 9,572,326 B2
(45) Date of Patent: Feb. 21, 2017

(54) POULTRY FEEDER WITH BEAK GROOMING DEVICE

(75) Inventor: Frederick W. Steudler, Jr., Conestoga, PA (US)

(73) Assignee: Valco Companies, Inc., New Holland, PA (US)

( * ) Notice: Subject to any disclaimer, the term of this patent is extended or adjusted under 35 U.S.C. 154(b) by 1266 days.

(21) Appl. No.: 13/309,911

(22) Filed: Dec. 2, 2011

(65) Prior Publication Data

US 2013/0139755 A1    Jun. 6, 2013

(51) Int. Cl.
  *A01K 39/01*      (2006.01)
  *A01K 39/012*     (2006.01)
  *A01K 39/014*     (2006.01)

(52) U.S. Cl.
  CPC ......... *A01K 39/0125* (2013.01); *A01K 39/012* (2013.01)

(58) Field of Classification Search
  CPC  A01K 39/0125; A01K 39/012; A01K 39/014; A01K 39/04
  USPC .................. 119/52.1, 53, 57.4, 61.1, 61.5
  See application file for complete search history.

(56) References Cited

U.S. PATENT DOCUMENTS

| | | | |
|---|---|---|---|
| 2,116,699 A * | 5/1938 | Ludike | A01K 39/012 119/54 |
| 2,849,982 A * | 9/1958 | Diseker | A01K 39/012 119/52.1 |
| 3,033,163 A | 5/1962 | Hostetler et al. | |
| 3,230,933 A | 1/1966 | Myers et al. | |
| 3,415,228 A | 12/1968 | Myers | |
| 3,598,087 A | 8/1971 | Ramser | |
| 3,971,340 A | 7/1976 | Allen | |
| 4,003,339 A | 1/1977 | Hostetler | |
| 4,476,811 A | 10/1984 | Swartzendruber | |
| 4,552,095 A * | 11/1985 | Segalla | A01K 39/0125 119/53 |
| 5,007,380 A | 4/1991 | Badia et al. | |
| 5,235,934 A * | 8/1993 | Runion | 119/51.01 |
| 5,765,503 A * | 6/1998 | van Daele | 119/52.4 |
| 6,655,317 B1 | 12/2003 | Steudler, Jr. et al. | |
| 2009/0078209 A1* | 3/2009 | Kroeker | A01K 5/01 119/52.1 |

* cited by examiner

*Primary Examiner* — Thien Thanh Pham
(74) *Attorney, Agent, or Firm* — Duane Morris LLP

(57) ABSTRACT

A poultry feeder with beak growth control device is provided. In one embodiment, the feeder includes a feeder pan, a feeder tower, and a beak grooming ring. The grooming ring is removably inserted in the feeder and has an annular shape complementary configured to engage a corresponding shape of the feeder pan. Preferably, the grooming ring has a self-supporting structure that retains its complementary shape to the feeder pan independently of the pan when removed therefrom. The grooming ring is insertable and removable from feeder as a separable unit from the feeder and operable to abrade the beak while the birds feed, thereby controlling its growth and length.

14 Claims, 16 Drawing Sheets

POULTRY FEEDER WITH BEAK GROOMING DEVICE

FIELD OF THE INVENTION

The invention generally relates to the field of feeder systems used for feeding poultry, and more specifically poultry feeders that dispense feed to birds.

BACKGROUND OF THE INVENTION

A typical poultry house is long structure that may have a length of several hundred feet, a width of about 40-60 feet, and may house about 15,000-20,000 birds. Poultry houses are often equipped with an automated feeding system consisting of one or more feed delivery lines which run the length of the poultry house.

Poultry feedings systems of the pan-type are well-known in the art. Examples of such feeding systems and feeders used in them are disclosed in U.S. Pat. Nos. 6,655,317; 5,007,380; 4,476,811; 4,003,339; 3,971,340; 3,598,087; 3,415,228; 3,230,933; and 3,033,163; which are incorporated herein by reference in their entireties. As generally disclosed in these various patents, feed from an bulk feed storage tank located outside of the poultry house is conveyed and discharged into one or more feed hoppers or similar distributed receptacles that may be located inside the house.

An example of conventional pan-type feeding systems are shown in FIGS. 1A and 1B. Such poultry feeding systems generally include one or more indoor feed supply hoppers A fluidly coupled to a feed conveyor tube B communicating with the bottom of each hopper. A main feed supply pipe Q fluidly connects the outdoor bulk feed storage tank (not shown) to the one or more feed supply hoppers A and their respective feed conveyor tubes B. The supply hoppers A may be fluidly connected to the main feed supply pipe Q with expansion joints R that allow the supply hoppers A to be raised or lowered with respect to the stationary supply pipe Q which is fixedly hung from the poultry house structure.

In known fashion, within the feed conveyor tube B is a helical conveyor or auger driven by motor C that conveys the granular feed from the hopper A into the plurality of poultry feeders D. Each of the poultry feeders D has a feed bowl or pan E into which the feed passes from feed conveyor tube B through a feed drop tube or feeder tower H, and a protective grill F that enables the birds to obtain feed from the feeder pan, but prevents the birds from entering the feeder pan (see also FIGS. 2A and 2B showing a feeder D and feeder tower H, respectively).

As shown in FIGS. 2A and 2B, the generally tubular feeder tower H may contain windows or openings L through which feed is delivered to the feed pan E and a plurality of fins M to minimize the likelihood of birds from scratching feed out of the pan. The feeder towers H generally include provisions on top for supporting an anti-roost wire K that extends longitudinally along and above feed conveyor tube B as shown in FIG. 1.

It is also known to support the poultry feeders D by attaching the feeder tower H of the feeders to the conveyor tube B as shown in FIG. 1 via an opening J formed in a feeder tower cap I affixed to the top of the feeder tower (see also FIGS. 2A and 2B). Openings in the feed conveyor tube B communicate with a feed inlet in the tower cap I that delivers feed to the feeder pan D below via gravity.

When the birds are very young, the poultry feeders D may be located on, or adjacent to the floor (not shown below the feeders). As the birds mature and grow, the entire feeding system is raised above floor level to enable the birds to readily access and obtain feed from the feeder pans. Typically, a motorized (or alternatively manual) winch system is provided comprising a motorized winch N and a series of pulleys O and support wires G attached to the feed conveyor tube B that are used to support the poultry feeders D. The entire conveyor tube/poultry feeder assembly B, D is raised or lowered in unison as a single unit to a using the winch system to the desired level needed to effectively feed the birds.

For broiler breeders, it is desirable to carefully ration the amount of feed that the birds receive to allow for a more moderate growth rate than broilers. As an example, breeders may be generally fed approximately 110-170 grams of feed daily in contrast to broilers which are fed larger amounts of feed to attain grow-out size more quickly. Accordingly, there is a further need to provide the ability to regulate the amount of feed charged in the feeder D in a controlled manner.

Referring to FIGS. 2A and 2B, the relative positions between the bottom outlet of the feeder tower H and the feed pan E may be manually adjusted via adjustment ring mechanisms P (often marked with indicia Q for setting repeatability) in some of the foregoing known feeders D. This restricts and regulates the amount of feed that may enter and fill the pan to obtain a predetermined desired level of feed in the pan during the pan filling operation of the feed system. Although such feeder systems may regulate the amount of feed provided to the birds, these known system generally do not provide a means for fully closing or shutting off the feeders D and preventing the delivery of feed from the feeder tower H into the feed pan E. Because these prior known feeders D are generally always in an "open" or "on" condition such that when feed is delivered to the feeders via feed conveyor tube B during the feeder fill or charging operation, the feed is immediately dispensed from the feeder tower H into the feed pan E in real time to the awaiting birds. Therefore, these known feed systems generally lack the ability to keep the feed conveyor tube B network and feeders D fully charged immediately prior to the intended feeding time, which is important for ensuring that an accurate amount of feed is dispensed to the birds and that all feeders D are uniformly filled with the same amount of feed and available at the same time.

In addition, if feed equipment malfunctions occur during the instantaneous type feeder charging and feed dispensing operation with such known feed systems, there is little or no time to take corrective action to remedy the equipment problems. The feeders may be only partially charged or not charged at all with feed. Consequently, the birds may not receive feed at the intended time.

A problem also encountered in commercial poultry production is a way to effectively control the growth of a bird's beak. Because poultry tend to peck each other, it is important to keep the beaks trimmed in length to prevent injury to the birds. In addition, if the growth of the beak is not controlled in some manner, crossing may occur as the beak grows very long which interferes with the ability of the bird to feed properly.

In their natural free range habitat, the length of a bird's beak is controlled by feeding off the ground. Pebbles or stones keeps the beaks trimmed in length by gradually abrading away the beak at a relatively slow pace while the birds feed. Conventional feeders as described herein do not provide a mechanism for keeping the beaks trimmed. Such feeders generally are comprised of a plastic feeder tower and feeder pan which are softer than a bird's beak and thus incapable of abrading and controlling the length of the beak.

Beak trimming (also referred to as "debeaking") has been employed in an attempt to control beak growth. In this practice, part of the beak is removed to shorten the length of the beak. However, this practice is controversial and cumbersome to implement as each bird must have its beak trimmed.

Some attempts have been made to apply a thin abrasive coating directly onto the generally plastic poultry feeder itself with an adhesive, or to directly apply thin sheets of abrasive material similar to sandpaper to the feeder which has an adhesive backing are flexible enough to conform to the shape of the feeder surfaces to which the sheet is applied. Such an arrangement is shown, for example, in U.S. Pat. No. 5,235,934. However, the birds may quickly wear through such thin layers of abrasive rendering the feeders ineffective for controlling beak length and growth. Moreover, once the abrasive material is gone from the already worn feeder pans and/or towers, it generally impractical to thoroughly clean each and every feeder and then attempt to properly reapply a new abrasive coating or sheets and achieve satisfactory adhesion. The feeder pans must therefore be discarded and replaced with all new pans.

An improved poultry feeder with readily replaceable beak growth control device is therefore desired.

SUMMARY OF THE INVENTION

Embodiments of the present invention provide a poultry feeder having a separable, easily replaceable beak grooming ring which may be removably inserted in the feeder. The grooming ring acts as an annular-shaped sacrificial feeder pan liner and is operable to control the growth and length of a bird's beak. The grooming ring is configured and comprised of one or more materials capable of gradually abrading the beak of a bird.

In preferred embodiments, at least a portion of the grooming ring that is exposed to and makes contact with a bird's beak while it feeds has hardness greater than the beak and sufficient surface roughness to gradually wear down the beak to simulate the natural effect of free range feeding described above. As birds eat from the feeder, the beak may be worn away at an appropriate predetermined rate to keep beak growth in check by selecting suitable materials for the grooming ring that offset the natural growth rate of the beak.

In more preferred embodiments, the beak grooming ring may be made of suitable metal or metal alloys. The grooming ring may incorporate abrasive particles to enhance the erosive properties of the ring. In other less preferred but suitable embodiments, the separable grooming ring may be made of polymer including plastics that incorporates abrasive particles either bonded to the surface of the ring or dispersed throughout the polymer during the molding process. The material selected for the grooming ring is preferably biocompatible and non-toxic to poultry in the event material becomes dislodged and ingested as the birds feed.

Preferred embodiments of the grooming ring have a relatively rigid or semi-rigid self-supporting structure that is operable to retain a complementary shape or configuration to the feeder pan when removed from the pan so that the ring is insertable and removable from feeder as a separable unit. The term "rigid" and "semi-rigid" is used herein in the foregoing relative context of the grooming ring being sufficiently stiffened in structure and material to retain its shape without relying on another structure such as the feeder pan or feeder tower to give shape to the ring. Accordingly, in instances where the grooming ring may be made of polymer including plastics, for example, there may be some degree of flexibility in such semi-rigid structures so long as the ring is operable to retain its configuration or shape independently of the feeder.

According to one embodiment, a poultry feeder with beak growth control device includes a feeder pan, a feeder tower operable to receive and dispense feed into the feeder pan, and a removably insertable beak grooming ring. The grooming ring has an annular shape that is complementary configured to conform to the shape of and engage a mating portion of the feeder pan that typically holds feed from which the birds will eat. In more preferred embodiments, the grooming ring advantageously is held in place to the mating feeder pan by a complementary geometry and gravity without the need for adhesives or other fastening devices.

In preferred embodiments, the grooming ring has a rigid or semi-rigid self-supporting structure that retains its complementary shape to the feeder pan when removed from and independently of the pan. The grooming ring is therefore insertable and removable from poultry feeder as a separable unit.

According to one embodiment, a beak grooming ring is provided that is removably insertable into a poultry feeder that includes a feeder tower and a feeder pan having a conical central portion and a bowl portion configured for holding feed. The grooming ring may include an annular shaped body having an open central passageway extending between opposing bottom and top open ends of the grooming ring, an upwardly sloped center section complementary configured to engage the conical central portion of the feeder pan, and a circumferentially extending and upwardly flared concave bowl section configured for holding feed and disposed around the center section of the grooming ring. The center section is preferably complementary configured to engage the bowl portion of the feeder pan. The body of the grooming ring further includes an outwardly flared outer peripheral section disposed circumferentially around the bowl portion which defines an annular edge rim. The grooming ring has a rigid or semi-rigid self-supporting structure that retains its shape independently of the feeder pan when removed from the pan.

According to other aspects, the present invention further provides poultry feed system having a plurality of feeders that advantageously may be fully charged with feed while precluding feed from entering the feeder pan until the desired feeding time. The individual feeder units may therefore be pre-charged and immediately ready to dispense a full and measured ration of feed to the birds in a controlled manner. Advantageously, overfeeding the risk of overfeeding is minimized or eliminated.

To enable a fully charged feed system to be maintained, a poultry feeder according to embodiments of the present invention provides a mechanism for completely shutting off the flow of feed into the feeder pan at each feeder. This allows the system and individual feeders to be fully charged with feed, but at the same time precludes feed from flowing into the feeder pan until the desired feeding time. In one embodiment, the shutoff mechanism is achieved by a feeder tower that is axially movable in a vertical direction with respect to the feeder pan between a lowered closed/shutoff position and a raised upper open/dispensing position. In the closed position, the bottom of the feeder tower engages the feeder pan to prevent outflow of feed from a fully charged tower into the pan. In the open position, the feeder tower is vertically raised so that the bottom of the tower disengages the feeder pan forming an annular shaped feed opening or orifice so that feed may flow from the charged tower via gravity into the pan.

In additional embodiments of the present invention, a poultry feeder includes an adjustment mechanism that provides user-variable adjustment of the relative positions between the open bottom of the feeder tower and the feeder pan. This controls the size of the feed opening or gap between the feeder tower and feeder pan, and correspondingly regulates the amount of feed entering the pan when the feeder tower is moved to the raised open/dispensing position. In one embodiment, the adjustment mechanism is achieved by a rotatable adjusting collar that allows a user to selectively preset the gap between the feeder tower and feeder pan when the feeder tower is in the fully open position.

According to one embodiment, a poultry feeder includes a feeder pan, a grill assembly mounted on the feeder pan, an adjusting collar supported by the grill assembly, and a feeder tower. The feeder tower includes an upper portion for receiving feed and a lower portion having an open bottom end for dispensing feed into the feeder pan. The feeder tower is moveable relative to the feeder pan from a closed position in which the feeder tower engages the feeder pan, to a open position in which the feeder tower is spaced apart from the feeder pan. In one embodiment, the bottom end of the feeder tower engages the feeder pan in the closed position and the bottom end of the feeder tower is spaced apart from the feeder pan by a gap in the open position. In one embodiment, the closed position is a lower position of the feed tower with respect to the feeder pan and the open position is a raised position higher than the lower position of the feeder tower with respect to the feeder pan. The feeder operates to preclude feed from entering the feeder pan when the feeder tower is in the closed position when lowered to the floor and operates to dispense feed into the feeder pan when in the feeder tower is in the raised and open position. In one embodiment, feeder tower engages the adjusting collar when in the raised open position which limits the size of the gap formed between the bottom end of the feeder tower and the feeder pan. In further embodiments, the adjusting collar is rotatably supported by the grill assembly, wherein the adjusting collar is selectively adjustable in vertical position with respect to the feeder pan and grill assembly by rotating the adjusting collar. The adjusting collar is operable to vary the gap formed between the bottom of the feeder tower and feeder pan when the feeder tower is in the raised open position.

According to another embodiment, a poultry feeder includes a feeder pan including a bowl portion for holding feed and a central portion extending upwardly from the bowl portion, and a grill assembly mounted on the feeder pan; the grill assembly having a cylindrical hub elevated above the feeder pan. An adjusting collar may be provided that is concentrically arranged inside the hub; the collar rotatably engaging the hub and being vertically positionable with respect to the hub by rotating the collar. The feeder further includes a feeder tower including an upper portion configured for coupling to an overhead poultry feeding system and a lower portion having an open bottom end, the feeder tower independently moveable in a vertical direction through the adjusting collar. The feeder tower is preferably moveable relative to the feeder pan from a lowered closed position in which the bottom of the feeder tower engages the feeder pan, to a raised open position in which the bottom end of the feeder tower is spaced above the feeder pan by a distance. The feeder is operable to hold feed when in the closed position without dispensing feed into the feeder pan, and further operable to dispense feed into the feeder pan when in the raised and open position. The feeder tower includes a travel stop surface that is engageable with a bottom end of the adjusting collar, wherein adjusting the vertical position of the adjusting collar with respect to the hub changes the distance between the bottom end of the feeder tower and feeder pan when the feeder tower is in the raised open position to control the amount of feed dispensed to the feeder pan.

A method for operating a poultry feeder is also provided. In one embodiment, the method includes: providing a poultry feeder comprising a feeder pan, a grill assembly, an adjusting collar, and a feeder tower configured for receiving and dispensing feed to the feeder pan; engaging an open bottom end of the feeder tower with the feeder pan, the feeder tower being in a first lowered closed position; filling the feeder tower with feed, wherein feed is prevented from flowing into the feeder pan by the engagement between bottom end of feeder tower and the pan; raising the feeder tower to a second upper open position; and disengaging the bottom end of the feeder tower from the feeder pan to form a gap therebetween, wherein feed flows into the feeder pan from the feeder tower. The method may further include a step of engaging the feeder tower with the adjusting collar during the raising step.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENTS

Figure 1A:
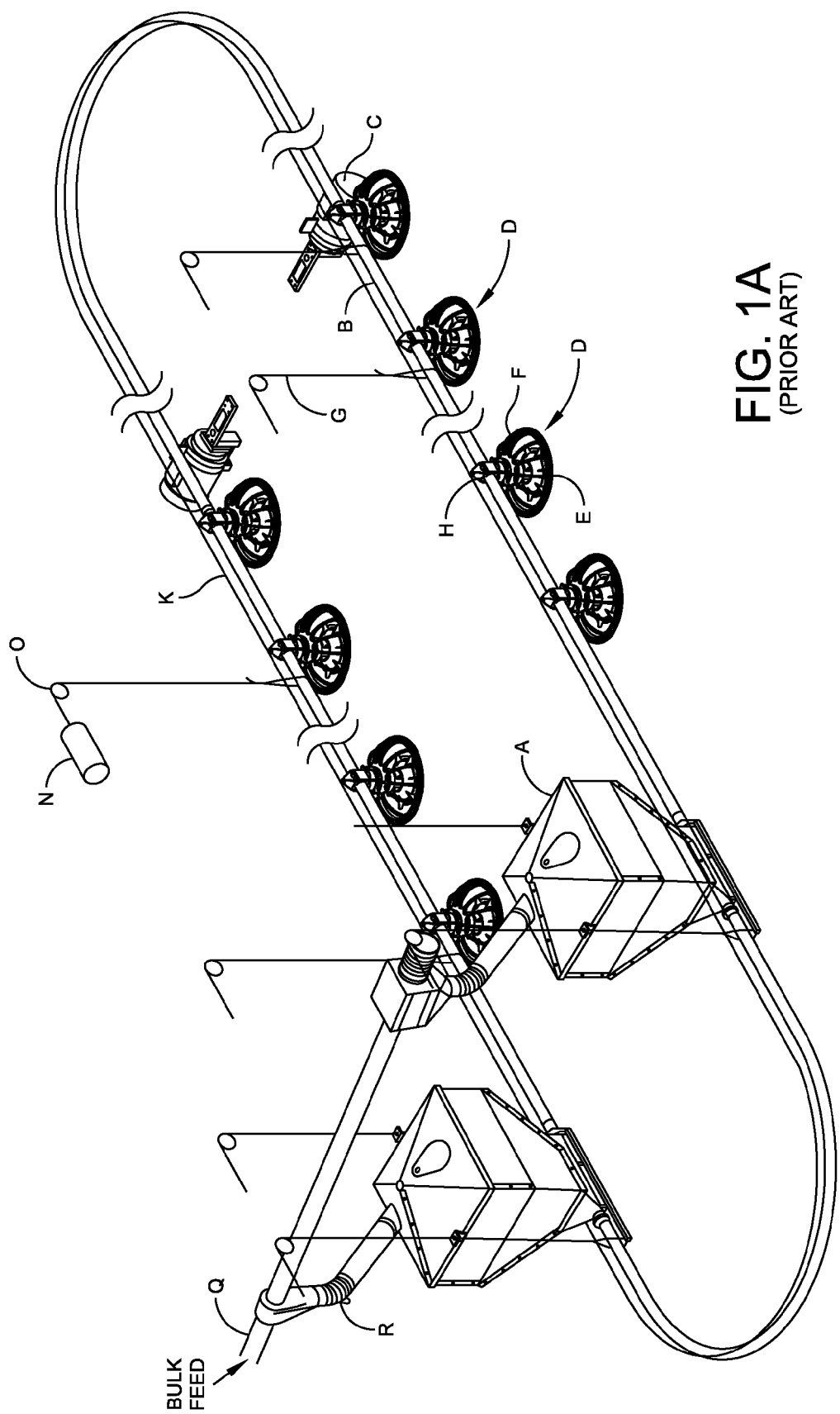
FIGS. 1A and 1B each show conventional pan-type poultry feeding systems with feeder supply hoppers, conveyor feed tubing, and poultry feeders.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein. In the claims, means-plus-function clauses, if used, are intended to cover the structures described, suggested, or rendered obvious by the written description or drawings for performing the recited function, including not only structural equivalents but also equivalent structures.

Figure 1B:
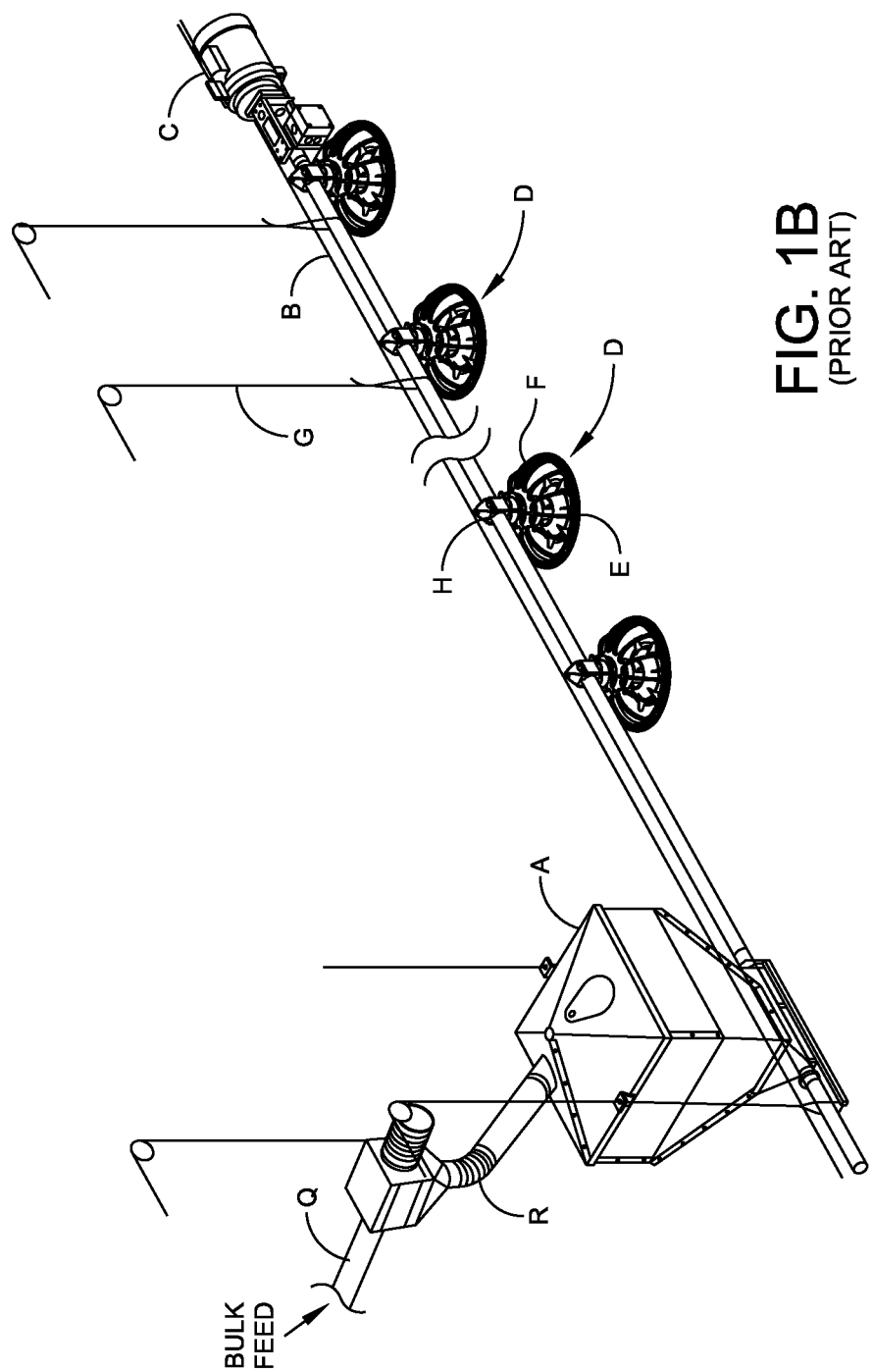
Figure 5:
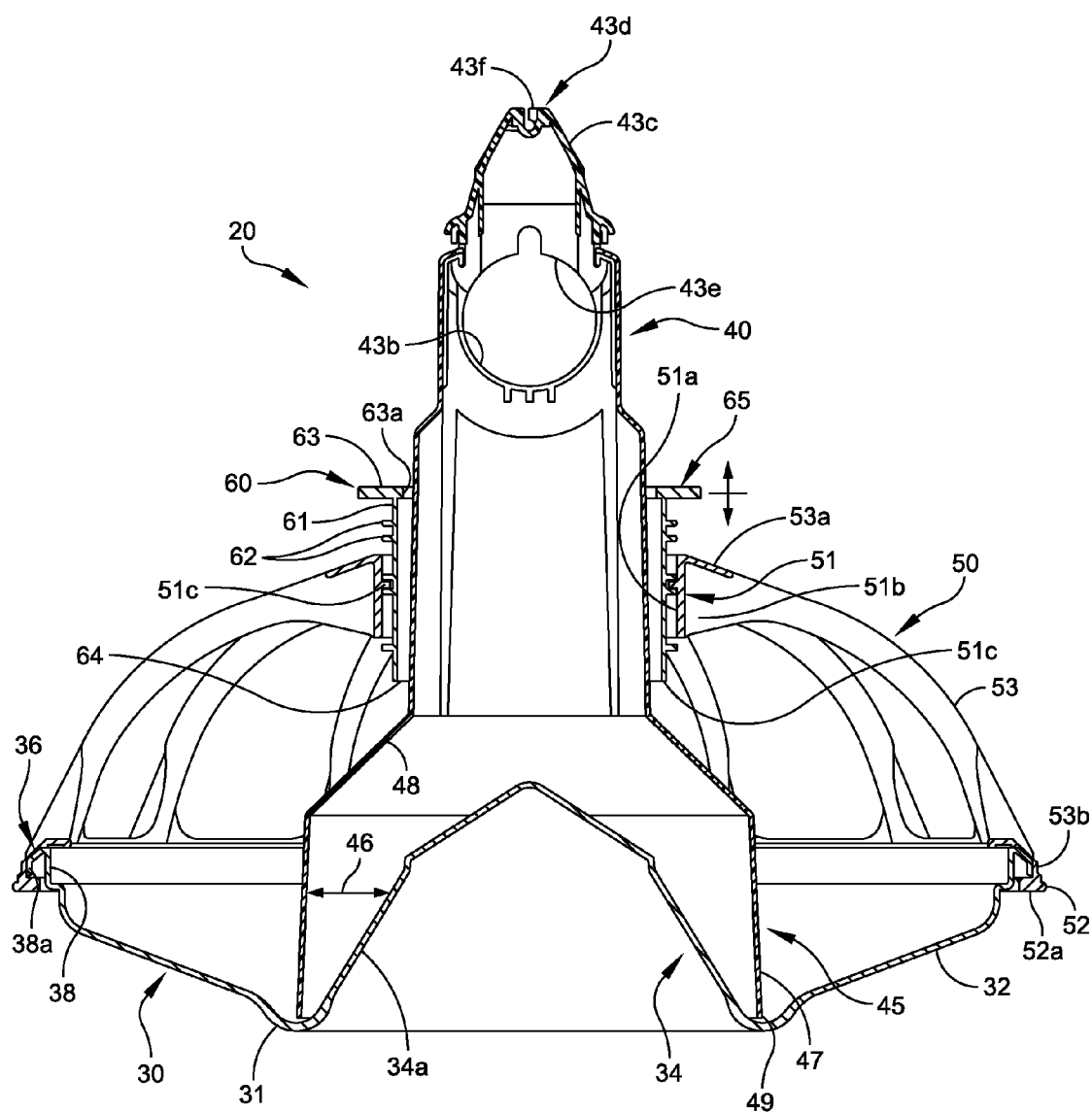
FIG. 5 is a cross-sectional side elevation view of a poultry feeder according to one embodiment of the present invention.
Figure 6:
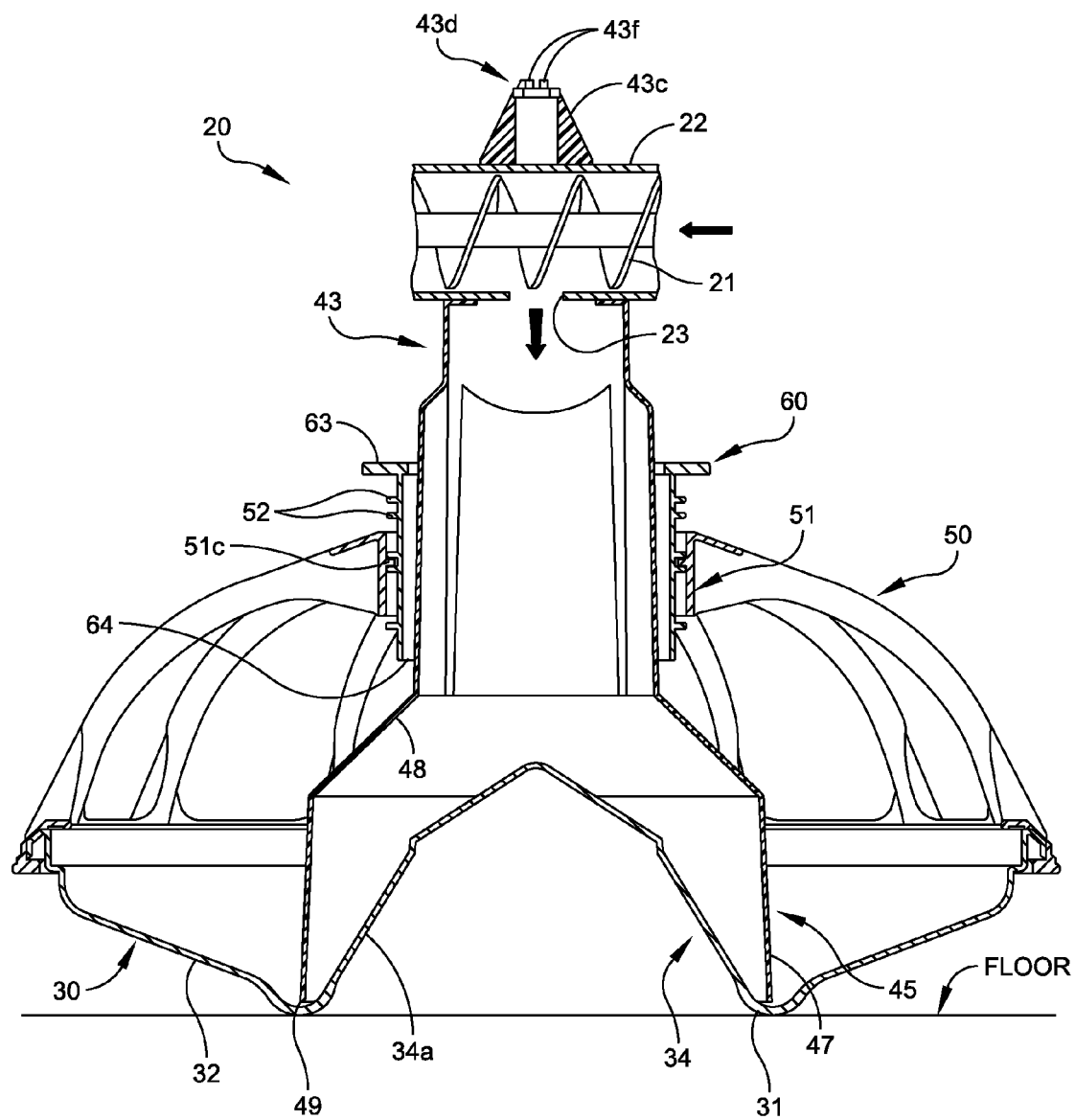
FIG. 6 is a cross-sectional side elevation view thereof rotated 90 degrees from FIG. 5 and showing the feeder tower in a fully closed shutoff position.
Figure 7:
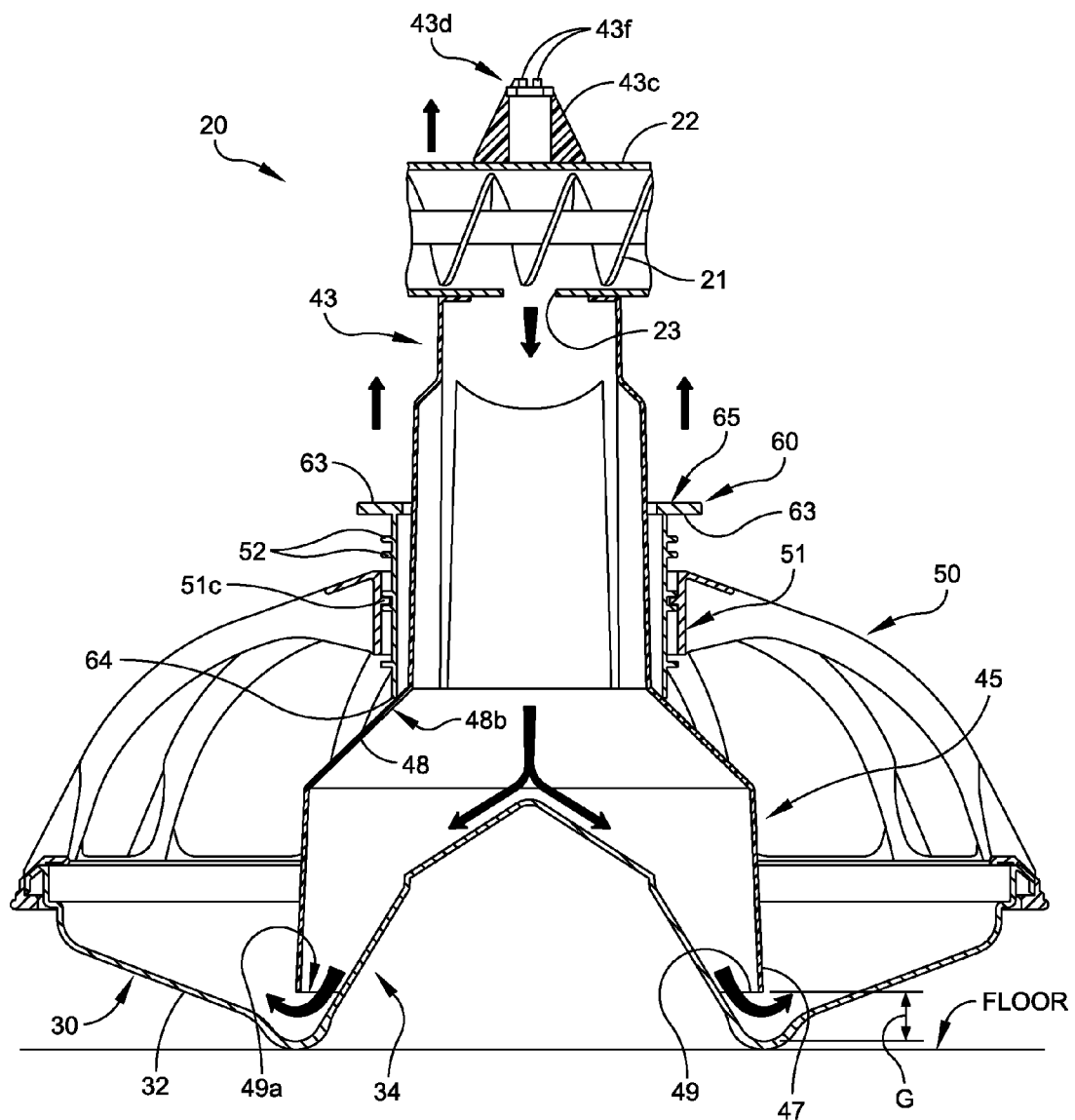
FIG. 7 is a cross-sectional side elevation view thereof showing the feeder tower in a fully open dispensing position.

FIGS. 5-7 show one embodiment of a poultry feeder 20 according to principles of the present invention. A plurality of poultry feeders 20 may be supported and suspended from a conventional poultry feed system as shown in FIG. 1, and include the various system components and functionality already described herein in the Background of the Invention.

Referring to FIGS. 5-7, poultry feeder 20 generally includes a feeder pan 30, a vertically elongated feeder tower 40 centrally positioned with respect to the feeder pan, and a grill assembly 50 positioned over the feeder pan. Feeder tower 40 projects vertically upwards with respect to the feeder pan as shown. Feeder tower 40 is axially movable in a vertical direction with respect to feeder pan 30 from a lowered closed or shutoff position shown in FIG. 6 to a raised or upper open dispensing position shown in FIG. 7. In the lowered closed position, the feeder tower 40 engages the feeder pan 30 to preclude feed from entering the feeder pan.

It will be appreciated that various alternative configurations of feeder pans 30, feeder towers 40, and cage assemblies may be provided. According, the invention is not limited to the specific embodiments shown and described herein.

Feeder pan 30 in one embodiment includes a circumferentially extending and upwardly flared bowl portion 32 defining a receptacle for holding feed, a central portion 34 extending upwardly from the bowl portion, and an outer peripheral portion 36 for mounting grill assembly 50, as shown in FIGS. 5-7. Bowl portion 32 may define a support base 31 configured so that feeder pan 30 may rest squarely on the ground. Base 31 may be annular in shape in some embodiments. Peripheral portion 36 defines a peripheral annular-shaped rim 38 to which grill assembly 50 removably attaches in one embodiment. Central portion 34 may be generally conical-shaped with inwardly angled walls 34a that extend circumferentially and is positionable inside feeder tower 40.

Figure 2A:
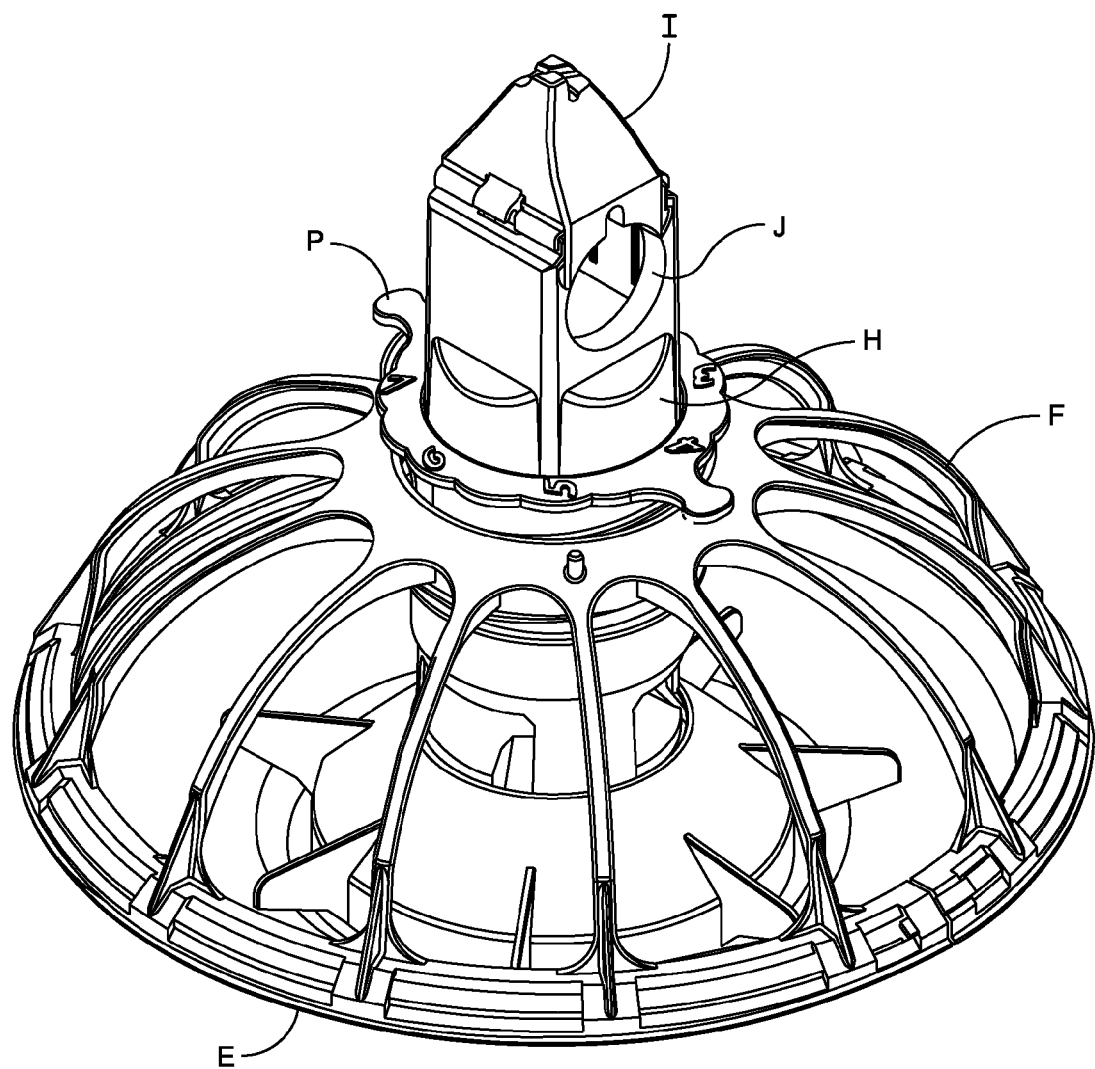
FIG. 2A is a perspective view of a conventional poultry feeder.
Figure 2B:
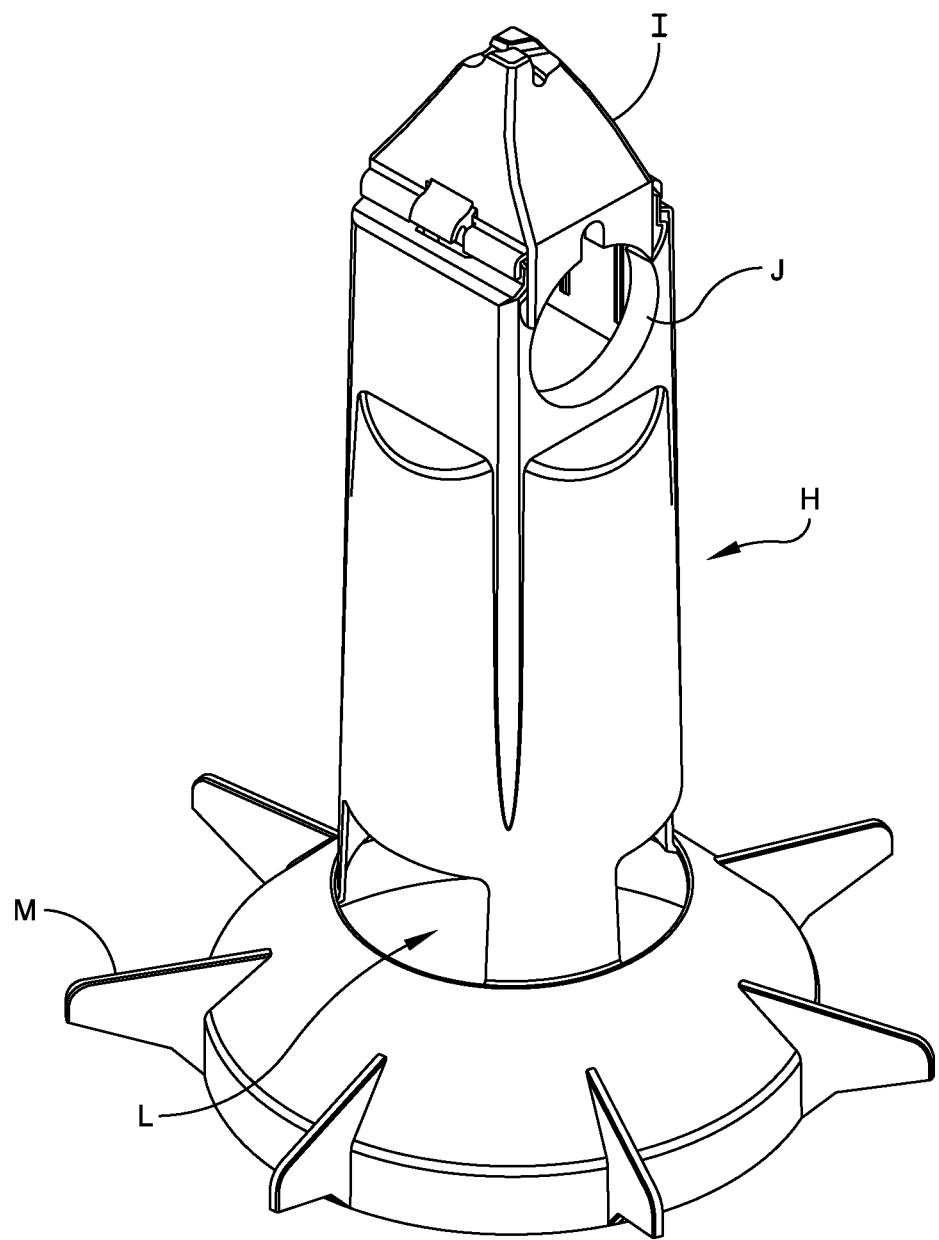
FIG. 2B is a perspective view of the feeder tower shown in FIG. 2A.

In one embodiment, bowl portion 32 of feeder pan 30 may be generally circular in shape when viewed from the top (similar to feeder pan E shown in perspective view in FIG. 2A). In other embodiments, bowl portion 32 may have any other suitable configuration including polygonal, oval or ellipsoidal, or various other shapes and compound shapes. Accordingly, the invention is not limited by the shape of feeder pan 30 provided.

Figure 3:
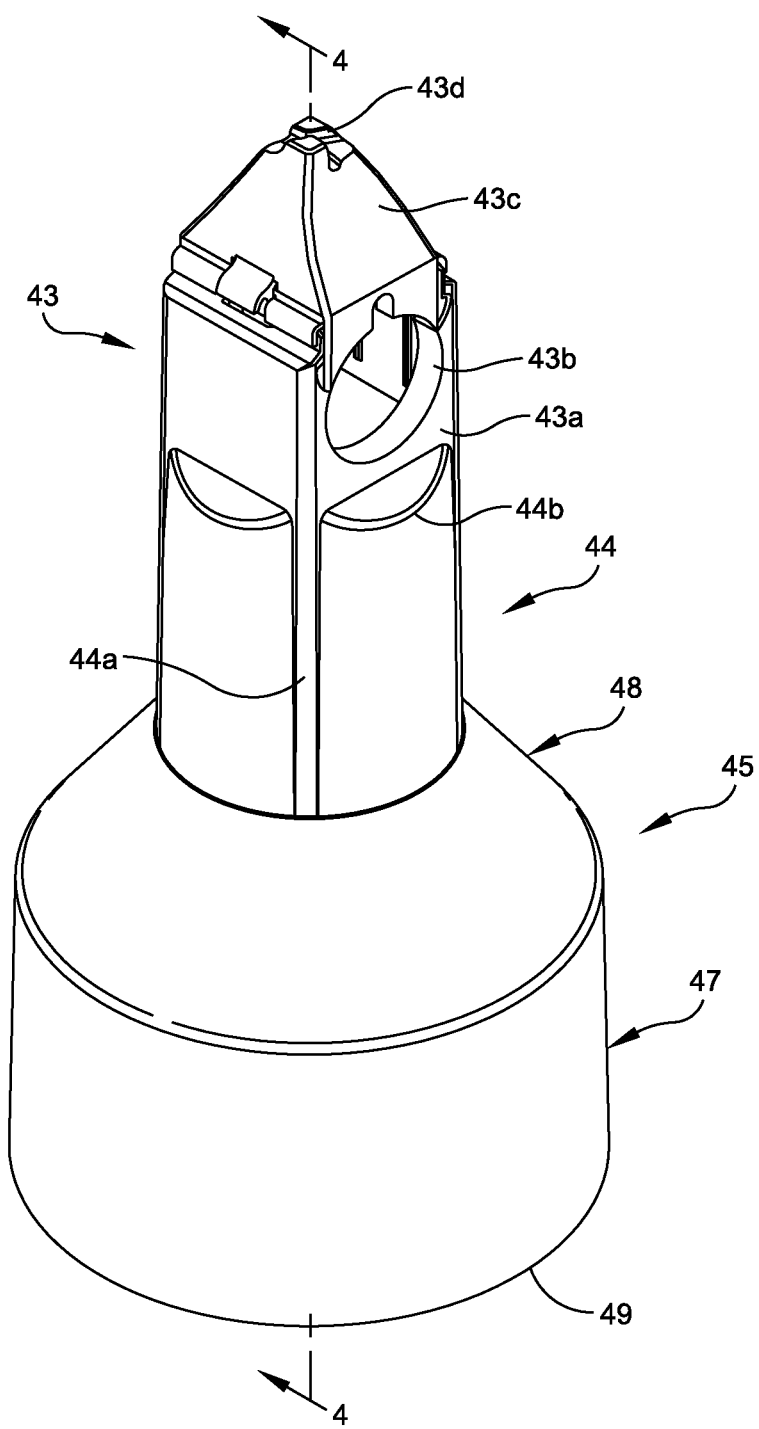
FIG. 3 is a perspective view of a feeder tower according to one embodiment of the present invention.
Figure 4:
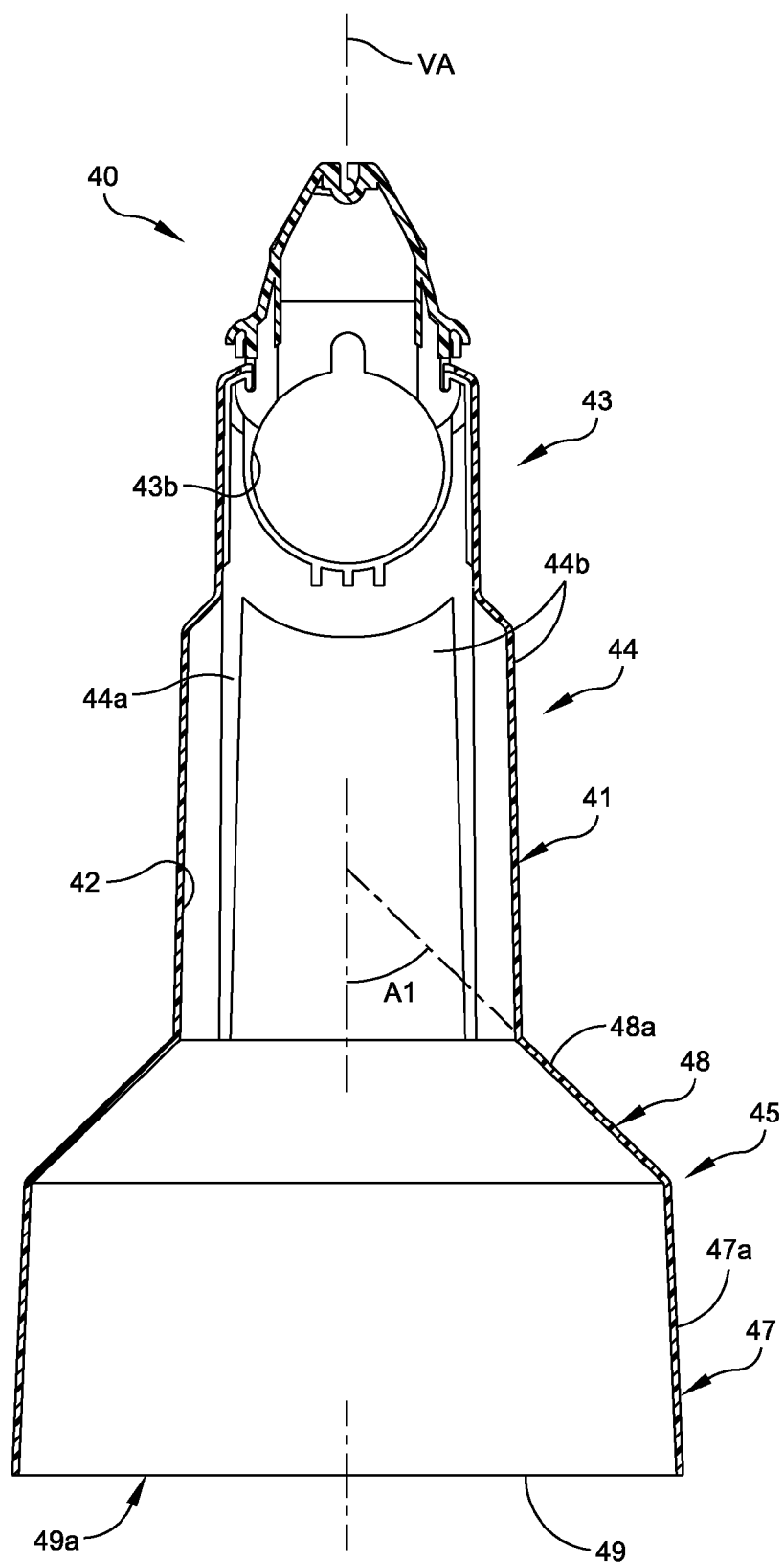
FIG. 4 is a cross-sectional side elevation view thereof.

FIGS. 3 and 4 show perspective and cross-sectional views of feeder tower 40, respectively. Referring to FIGS. 3-7, feeder tower 40 defines a vertical axis VA and may be a substantially hollow structure having vertically and circumferentially extending sidewalls 41 defining an open central passageway 42 for receiving feed and dispensing feed to the feeder pan 30 positioned below. Feeder tower 40 may include an upper feed inlet portion 43, a diametrically enlarged lower skirt portion 45, and a middle portion 44 disposed therebetween. In one embodiment, skirt portion 45 has a larger lateral cross-section area than inlet and middle portions 43 and 44, respectively. Lower skirt portion 45 terminates with an open bottom end 49 having an annular bottom edge 49a. Bottom end 49 is selectively and axially movable to engage feeder pan 30. Preferably, bottom end 49 and feeder pan 30 are mutually configured to avoid any appreciable gaps therebetween when end 49 of feeder tower 40 is seated and engaged with the pan in the closed position to preclude feed from entering the pan from the tower. In one preferred embodiment, the sidewalls 41 of feeder tower 40 in the lower skirt portion 45 and middle portion 44 are solid without any openings so that feed is only dispensed to feeder pan 30 through the open bottom end 49 of the feed tower.

Lower skirt portion 45 is preferably configured and dimensioned to be laterally spaced apart from conical central portion 34 of feeder pan 30, as shown in FIGS. 5-7. This defines a generally annular space 46 within open central passageway 42 of the feeder tower 40 that extends laterally between angled walls 34c of central portion 34 and walls 47a and 48a of skirt portion 45 through which feed flows into feeder pan 30 (see FIG. 7).

Referring to FIGS. 3-7, lower skirt portion 45 of feeder tower 40 in one embodiment includes a cylindrical section 47 defining a circumferentially extending vertical wall 47a and an adjoining sloped transition section 48 between cylindrical section 47 and middle portion 44 of tower 40. Cylindrical section 47 has an open tubular shape and a generally constant diameter in some embodiments from top to bottom as shown.

In some embodiments, transition section 48 of feeder tower 40 may be frusto-conical shaped as shown in FIGS. 3-7 having a circumferentially extending angled radial wall 48a that is sloped inwardly at an angle A1 with respect to vertical axis VA as shown in FIG. 4. Transition section 48 varies in diameter from top to bottom, and in the embodiment shown, is narrowest at top adjoining smaller diameter middle portion 44 and widest at the bottom adjoining larger diameter cylindrical section 47 of the lower skirt portion 45.

Feeder tower 40 further includes a vertical travel limit or stop surface 48b for operably engaging adjusting collar 60 when feeder tower 40 is in the open position shown in FIG. 7. The travel stop surface 48b restricts the maximum vertical distance that feeder tower 40 may be raised above and relative to feeder pan 30, thereby limiting the size of gap G formed between bottom end 49 of the feeder tower and the pan in the open position.

In one possible embodiment, angled wall 48a of transition section 48 described above may provide the travel stop surface 48b, which is oriented and dimensioned to make annular contact with bottom end 64 of adjusting collar 60. In alternative embodiments, as will be readily understood by those skilled in the art without need for graphic illustration, transition section 48 may simply comprise a stepped configuration formed by an annular flat horizontal surface bridged between larger diameter cylindrical section 47 of lower skirt portion 45 and smaller diameter middle portion 44 (reference FIG. 4). In this case, the flat annular surface of the step may form the travel stop surface on feeder tower 40.

In other embodiments (not shown), the travel stop surface 48b may be formed by any other suitably configured and dimensioned radially or laterally extending surface having an angle A1 greater than 0 degrees but less than 180 degrees measured from the vertical axis VA as indicated in FIG. 4 to enable the stop surface to engage the bottom end 64 of adjusting collar 60 as shown in FIG. 7. Suitable configurations of a travel stop surface disposed on feeder tower 40 that are contemplated may include without limitation protrusions, flanges, fins, tabs, lugs, pins, shoulders, stepped-shaped portions, etc. so long as the stop surface has a dimension and angle suitable to operably engage adjusting collar 60 when the feeder tower is in the raised open dispensing position shown in FIG. 7 for limiting the size of vertical gap G between the feeder tower and feeder pan 30.

Referring to FIGS. 3-7, middle portion 44 of feeder tower 40 may have a generally rectilinear configuration with two pairs of opposing walls 44a. Middle portion 44 may further include arcuate sections 44b in some embodiments as shown, which may be formed as outwardly extending curved protrusions of opposing walls 44a and form a transition to the generally circular shaped top opening of sloped transition section 48 of feeder 20. In one embodiment, inlet portion 43 may be defined as a plain top portion of opposing walls 44a above the location where arcuate sections 44b terminate so that the inlet portion comprises essentially two pairs of opposing flat walls 43a as shown in FIGS. 3 and 4. Inlet portion 43 receives feed from feed conveyor tube 22.

FIGS. 6 and 7 show poultry feeder 20, and specifically feeder tower 40 mounted to a portion of a poultry feeder system of the type shown in FIG. 1. Preferably, feeder tower 40 is suspended from feed conveyor tube 22 in one embodiment so as to be vertically movable in unison with raising and lowering of feed conveyor tube 22, as further described herein. Feeder tower 40 is preferably vertically movable independently of the feeder pan 30, adjusting collar 60, and grill assembly 50 which are interconnected.

Accordingly, referring to FIGS. 3-7, upper feed inlet portion 43 of feeder tower 40 is configured with a mounting assembly for releasable mounting to feed conveyor tubes 22. In one embodiment, the mounting assembly comprises one pair of opposing and spaced apart walls 43a of upper feed inlet portion 43 having partial mounting holes 43b configured for passing feed conveyor tube 22 therethrough and a releasable cap 43c. A bottom portion of cap 43c contains an arcuate cutout 43e which combines with partial hole 43b in wall 43a to form a complete circular opening when the feeder tower cap 40 is mounted to feed conveyor tube 22 and open top of feed inlet portion 43, as shown. Feeder tower 40 is thus releasably retained to feed conveyor tube 22 by cap 43c (best shown in FIGS. 3-5). The top of cap 43c may include an anti-roost wire support assembly 43d that is configured and dimensioned to slidably receive therethrough and hold an anti-roost wire K (see in FIG. 1) in conventional fashion. In one embodiment assembly 43d may include a lateral through opening defined by a pair of opposing pair of ledge elements 43f that extend over the anti-roost wire K. In some embodiments, anti-roost wire K may be electrified. Other suitable arrangements for supporting anti-roost wire K may be used.

Feed conveyor tube 40 houses a rotating helical conveyor or auger 21 positioned therein for transporting feed from a feed hopper A (see FIG. 1) to each of the individual feeders 20. The bottom of feed conveyor tube 22 contains an aperture 23 which communicates with central passageway 42 of feeder tower 40 for filling the tower with feed transported by the feed conveyor tube.

Referring to FIGS. 5-7, grill assembly 50 includes an upper hub 51 having a cylindrical shape with an open center forming an inner circular wall 51a and an outer circular wall 51b. The inner wall 51a has a diameter that is sized to permit the feed tower 40 and an adjusting collar 60 to be received therethrough, as further described herein. Accordingly, the hub 51 encircles the feeder tower 40 and adjusting collar 60 in one embodiment when feeder 20 is assembled. A plurality of radially extending and circumferentially spaced apart ribs 53 is provided that project downwardly and outwardly from hub 51. The spaces between ribs 53 provide a lateral opening through which the birds may feed from the feeder pan 30. Ribs 53 have an upper end 53a attached to or formed as a unitary part of hub 51 and a lower end 53b attached to or formed as a unitary part of an annular shaped mounting ring 52 that extends circumferentially. Mounting ring 52 attaches the grill assembly 50 to feeder pan 30. In one embodiment, ribs 53, hub 51, and mounting ring 52 are preferably molded as a single unitary structure.

As shown in FIGS. 5-7, mounting ring 52 on grill assembly 50 is preferably configured and structured to interlock with feeder pan 30. In one possible embodiment, mounting ring 52 may include an inwardly curved or turned lip 52a that releasably engages an outwardly and downwardly turned mating lip 38a on peripheral rim 38 of feeder pan 30. Lip 38a may be generally configured as an inverted "U" in some embodiments as shown. Grill assembly 50 and feeder pan 30 are therefore preferably separable. In some embodiments, annular mounting ring may not form a continuous circle, but may include a split or opening (not shown) to provide lateral flexibility to the rim allowing it to be snap-fit onto peripheral rim 38 on feeder pan 30.

It will be appreciated that grill assembly 50 may be attached to feeder pan 30 in numerous suitable ways other than expressly shown and described herein.

Poultry feeder 20 further includes an adjusting collar 60 shown in FIGS. 5-7. Adjusting collar 60 allows a user to preset the maximum vertical gap G formed between the bottom end of feeder tower 40 and feeder pan 30 when the feeder tower is in the raised open position, as shown in FIG. 7. Adjusting collar 60 has a generally tubular configuration with two open ends and is rotatably mounted on grill assembly 50. In one embodiment, adjusting collar 60 defines a circumferentially extending vertical wall 61 having an axial length, an open bottom end 64, and an open top end 65. Top end 65 may include a radially protruding operating flange 63 that may be used to rotate adjusting collar 60. Operating flange 63 has a central aperture 63a through which feeder tower 40 may axially move or slide. In some embodiments, operating flange 63 may include alphanumerical indicia similar to operating ring P shown in FIG. 2A to assist a user with repeatability in making collar settings that in turn regulates the gap G and amount of feed dispensed by feeder tower 40 into feed pan 30, as further explained herein.

To rotatably support and couple adjusting collar 60 to hub 51 of grill assembly 50, vertical wall 61 of adjusting collar 60 as shown in FIGS. 5-7 may have an outer surface with a helical thread 62 that threadably engages a mating helical thread 51c having a matching pitch that is formed on inner circular wall 51a of hub 51 of the grill assembly 50. As shown, threads 62 and 51a may be coarse threads axially spaced widely apart having for example, without limitation, a thread pitch of about 1 inch. In one embodiment, threads 62 may be configured as a closely spaced apart (axially) double thread configured and dimensioned to receive a single mating thread 51c therebetween.

Collar 60 preferably has an outside diameter that is smaller than the inside diameter of hub 51, but an inside diameter that is larger than the outside diameter of middle portion 44 of feeder tower 40 so that the feeder tower may move axially freely through the collar. The adjusting collar 60 is axially movable up and down in a vertical direction and freely rotatable with respect to feeder tower 40 which can move axially up or down within and independently of the collar without restriction (compare, e.g. FIGS. 6 and 7).

Rotating adjusting collar 60 axially moves and adjusts the vertical position of the collar with respect to grill assembly 50 and hub 51 via the threaded engagement between the collar and grill assembly. Referring to FIGS. 5-7, rotating adjusting collar 60 in opposing rotational directions causes bottom end 64 of the collar to be selectively projected from or retracted into collar hub 51 by a continuously variable distance, thereby allowing a user to adjust the distance that bottom end 64 extends beyond bottom end 51c of grill hub 51. This enables bottom end 64 of adjusting collar 60 to act as a vertical limit stop for feeder tower 40 which is vertically, axially moveable with respect to the collar and feeder pan 30. Concomitantly, adjusting collar 60 allows the user to regulate the size of gap G and amount of feed that is delivered to feed pan 30 when the feeder 20 is operated. A user may therefore use adjusting collar 60 to preset the maximum gap G formed when feeder tower 40 is in the open position shown in FIG. 7.

Referring to FIG. 7, the bottom end 64 of adjusting collar 60 engages and rests on travel stop surface 48b formed by a portion of feeder tower 40 when the tower is raised with feed conveyor tube 22. In one embodiment, without limitation, the stop surface 48b may be formed by angled wall 48a of the frusto-conical shaped transition section 48 (see FIGS. 3 and 4). The relative positions between a bottom end 49 of the feeder tower 40 and the feeder pan 30 is adjustable in a plurality of varying open positions by in turn adjusting the position of adjusting collar 60 with respect to grill hub 51 as described elsewhere herein. Each of these positions provides a different opening or gap G between the bottom end 49 of the feeder tower and the pan 30. Accordingly, increasing or decreasing the maximum distance between the feeder tower bottom end 49 and feeder pan 30 when feeder tower 40 is in the open position (see FIG. 7) via adjusting collar 60 concomitantly controls the amount of feed entering and level of feed in pan 30.

An exemplary method for operating poultry feed system according to principles of the present invention will now be described. The feed system may be generally configured as the conventional system shown in FIG. 1. However, a plurality of innovative poultry feeders 20 according to embodiments of the present invention having feed shutoff capability is instead provided in lieu of feeders D shown. Feeders 20 are suspended and supported from feed conveyor tube 22.

Referring now to FIGS. 1 and 5-7, poultry feeders 20 are mounted so at to be suspended from a respective feed conveyor tube 22 of a feed conveyor system in the manner previously described. Gravity urges the feeder pan 30, grill assembly 50, and adjusting collar 60 downward with respect to the feeder tower 40 which is independently supported by feed conveyor tube 22 and freely movable axially in a vertical direction with respect to the feeder pan, grill assembly, and collar. In one embodiment, each feeder tower 40 is preferably rigidly attached to their respective feed conveyor tube 22. Accordingly, feeder towers 40 may be operably raised and lowered in unison with raising and lowering of the feed conveyor tubes 22.

To initially setup the poultry feeding system before initiating a feeding cycle, each feed conveyor tubes 22 with network of attached poultry feeders 20 is first initially lowered and positioned using the winch motor N system previously described (see FIG. 1) so that the feeder pans 30 of the feeders 20 become located on and supported by the floor of the poultry house, as shown in FIG. 6. The feed conveyor tubes 22 are in their lowermost vertical position being spaced above the ground by a distance approximately equal to the height of the feeder assemblies 20.

As shown in FIG. 6, feeder tower 40 is initially in its lower closed or shutoff position with respect to feeder pan 30. Bottom edge 49a defined on bottom end 49 of lower skirt portion 45 is engaged with an inside surface on feeder pan 30 to prevent an outflow of any feed in the feeder tower into the pan. In the embodiment shown, bottom end 49 engages a surface on bowl portion 32 of feeder pan 30 at the base perimeter of conical portion 34. Accordingly, there preferably is no appreciable gap or opening between feeder tower 40 and feeder pan 30 to effectively fill the pan with feed. The feed supply to feeder pan 30 is therefore shut off.

With the feeder tower 40 in the closed or shutoff position in FIG. 6, the network of feed conveyor tubing 22 and feeders 20 may be fully charged with feed via operating the helical auger 21 (see feed flow arrows). To perform this step, the auger 21 drive motor C (see FIG. 1) is first actuated to rotate the auger 21, wherein feed is transported from feed supply hoppers A through the network of feed conveyor tubing 22 and then discharged into the individual feeder towers 40 to preferably fully charge the feed system and towers with feed (reference FIGS. 1 and 6). Once the feed system is fully charged, the auger 21 drive motor C may be stopped.

Since feeder tower 40 is in the closed or shutoff position engaged with feeder pan 30 as shown in FIGS. 5 and 6, essentially no feed flows into the feed pan from the feeder towers 40. In addition, it will be appreciated that since the feeder towers 40 are rigidly mounted to feed conveyor tube 22 in the present embodiment, the weight of the feed conveyor tubing 22 network and feed supply hoppers A (hung from the motorized winch N system by the series of pulleys O and support wires G as shown in FIG. 1) helps to push or force the feed towers 40 downward tightly against the bowl portion 30 of the feeder pans 30 to the greatest extent practicable to minimize any leakage of feed into pan 30.

With the poultry feeding system fully charged with feed, a feeding cycle may next be initiated. The birds may be fed by raising the feeder towers 40 upward with respect to feed pan 30 to their raised upper open or dispensing position shown in FIG. 7. This step may be performed by actuating the motorized winch N system shown in FIG. 1 to raise the network of feed conveyor tubing 22. This simultaneously raises feeder towers 40 which are hung from the tubes 22 (see directional arrows in FIG. 7). Each feeder tower 40 slidably moves upward through feeder 20 relative to the feeder pan 30, adjusting collar 60, and grill assembly 50 which are interconnected and remain stationary on the floor of the poultry house. Accordingly, feeder pan 30 remains stationary and in contact with the floor of the poultry house as the feeder towers 40 are lifted as shown.

In one embodiment of the operating method, feeder tower 40 is raised (via and together with feed conveyor tubing 22) until travel stop surface 48*b* engages open bottom end 64 of adjusting collar 60 as shown in FIG. 7. In one embodiment, a portion of sloped transition section 48 (specifically angled wall 48*a*) of lower skirt portion 45 forms stop surface 48*b* that engages bottom end 64 of adjusting collar 60. Feeder tower 40 is operably now in a fully open/dispensing position. Bottom end 49 is separated from feeder pan 30 by a vertical distance or gap G as shown (compare FIG. 6). Feed now flows freely by gravity outwards through open bottom end 49 of feeder tower 40 and gap G into feeder pan 30 (see directional arrows) since the bottom edge 49*a* at is now raised above and spaced apart from the inside bottom of the feeder pan as shown. In conventional fashion, feed will enter feeder pan 30 and fill to a level corresponding to the height of bottom edge 49*a* of feeder tower 40 above the feeder pan.

Bottom end 64 of adjusting collar 60 acts as an axially adjustable vertical travel limit stop for feeder tower 40 that prevents further relative movement of the feeder tower with respect to feeder pan 30 assembly including adjusting collar 60 and cage assembly 50. With travel stop surface 48*b* of angled wall 48*a* on the feeder tower 40 now engaged with bottom end 64 of adjusting collar 60 as shown in FIG. 7, further rising of the feeder tower will also concomitantly raise the whole feeder 20 assembly including the adjusting collar, grill assembly 50 and feeder pan 30. The axial gap G between bottom end 49 of feeder tower 40 and the inside bottom of feeder pan 30, however, will remain the same and fixed by the position of the open bottom end 64 of adjusting collar 60 regardless of the height to which feeder 20 may be raised above the floor.

To adjust the level of feed in feeder pan 30 preferably before feeding time, the adjusting ring 60 may be rotated by a user in opposing rotational directions which translates into raising or lowering axial motions respectively of the adjusting ring bottom end 64 in relation to the feeder pan. This ultimately limits the size of gap G and maximum height that the bottom end 49 of feeder tower 40 may be raised above feeder pan 30 as shown in FIG. 7.

In one possible operating mode if the intent is to feed young birds, the feeder towers 40 are raised upward only to the vertical position shown in FIG. 7 wherein the feeder pans 30 remain resting on the floor so that the birds can reach the feed.

Alternatively, in another possible operating mode if the intent is to feed more mature birds, the feeders 20 may be raised to a vertical position higher than shown in FIG. 7 so that the feeder pans 30 are elevated above the floor by a predetermined distance. The feeder, however, will remain in the fully open position shown in FIG. 7 with the axial distance between open bottom end 64 of feeder tower 40 and feeder pan 30 remaining fixed. The height of the feeder pan 30 above the floor will be dictated by the size of the birds and selected so that the birds may readily access the feed in the pans.

Prior to the next feeding cycle, the poultry feeders 20 are returned to their fully closed position shown in FIG. 6 by reversing the operation described above. In essence, the feed conveyor tubing 22 is lowered which simultaneously lowers and returns feeder towers 40 to their lower closed/shutoff positions as shown. Bottom end 49 of now empty feeder tower 40 is engaged with feeder pan 30 and gap G is eliminated. Next, the auger 21 may be actuated and rotated again fully charge the feed feeder towers 40 with feed. Once the feeder towers 40 are filled, the auger may be stopped. The poultry feeding system is now fully charged and ready to begin another feeding cycle.

In one preferred embodiment, the poultry feeder 20 and its constituent parts including feeder tower 40, grill assembly 50, and feeder pan 30 may be made of suitable polymer material that may be injection molded or formed by other processes commonly used in the art for making such parts.

Poultry Feeder Pan Beak Grooming Liner or Ring

According to another aspect of the invention, a beak grooming liner or ring is provided that is removably insertable into a poultry feeder. The grooming ring is operable to abrade and control the growth and length of a bird's beak while the bird feeds. Advantageously, the grooming ring is replaceable by a user since the ring is preferably self-supporting and relatively rigid or semi-rigid in structure in more preferred embodiments thereby making the ring readily separable from the feeder. If the ring wears out or the poultry feeders require cleaning, the user simply removes the worn ring and/or replaces it with a new one.

Figure 8:
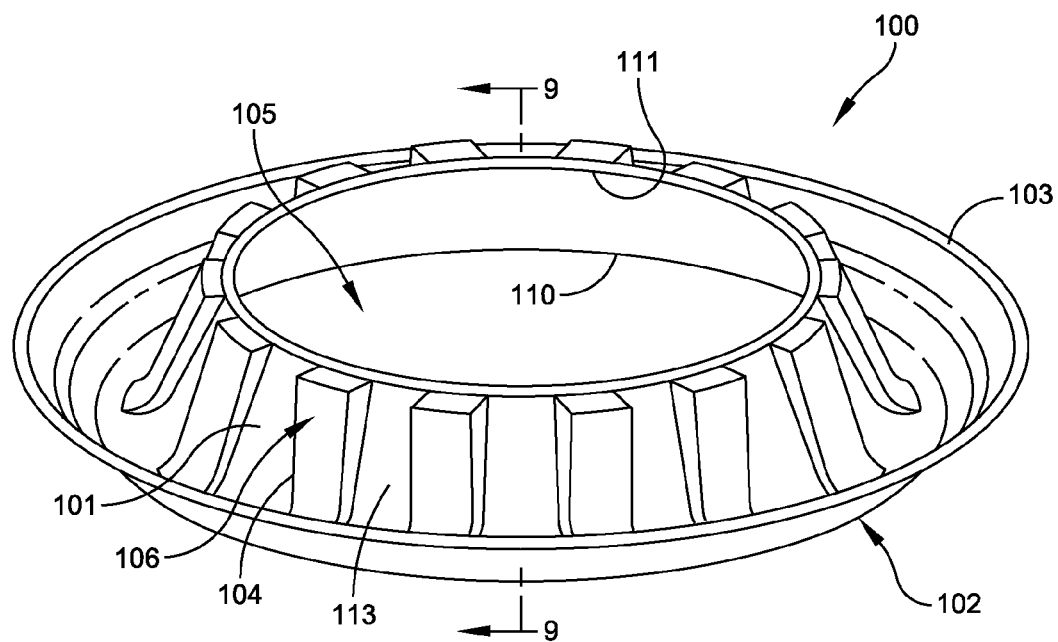
FIG. 8 is a perspective view of a first embodiment of a beak grooming ring that is removably insertable into the poultry feeder of FIG. 5 for controlling the growth of a birds beak while it feeds.
Figure 9:
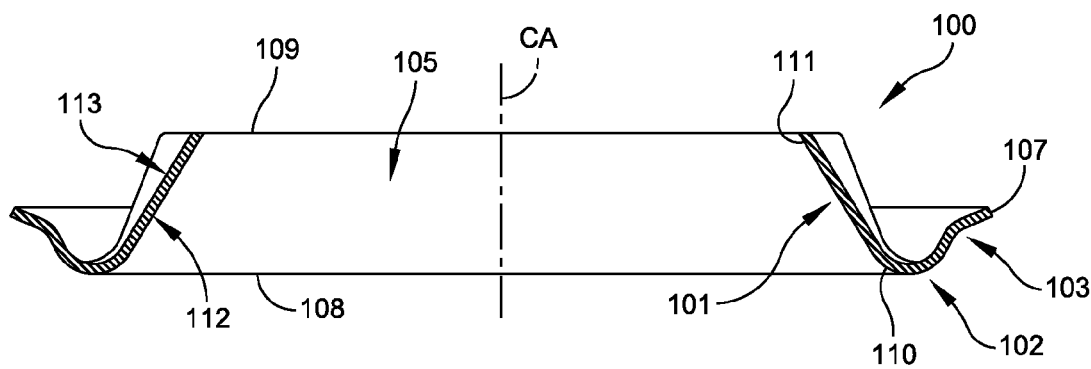
FIG. 9 is a cross-sectional side view thereof.

FIGS. 8 and 9 show one embodiment of a beak grooming ring 100 having an annular-shaped body including an upwardly sloped center section 101, a circumferentially extending and upwardly flared concave bowl section 102 configured for holding feed and disposed around the center section, and an outwardly flared outer peripheral section 103 disposed circumferentially around the bowl portion and defining a peripheral annular edge rim 107. Grooming ring 100 further defines a generally horizontal open bottom end 108 and open top end 109, and a central passageway 105 extending between the ends. As shown in FIG. 9, grooming ring 100 may be considered to have a generally U-shaped cross-sectional configuration in some embodiments. The arms of the "U" are defined by the angled walls of center section 101 and peripheral section 103 which are angled with respect to the horizontal planes defined by the bottom and top ends 108, 109. The bottom portion of "U" is defined by bowl section 102 which is configured for holding feed.

Figure 14:
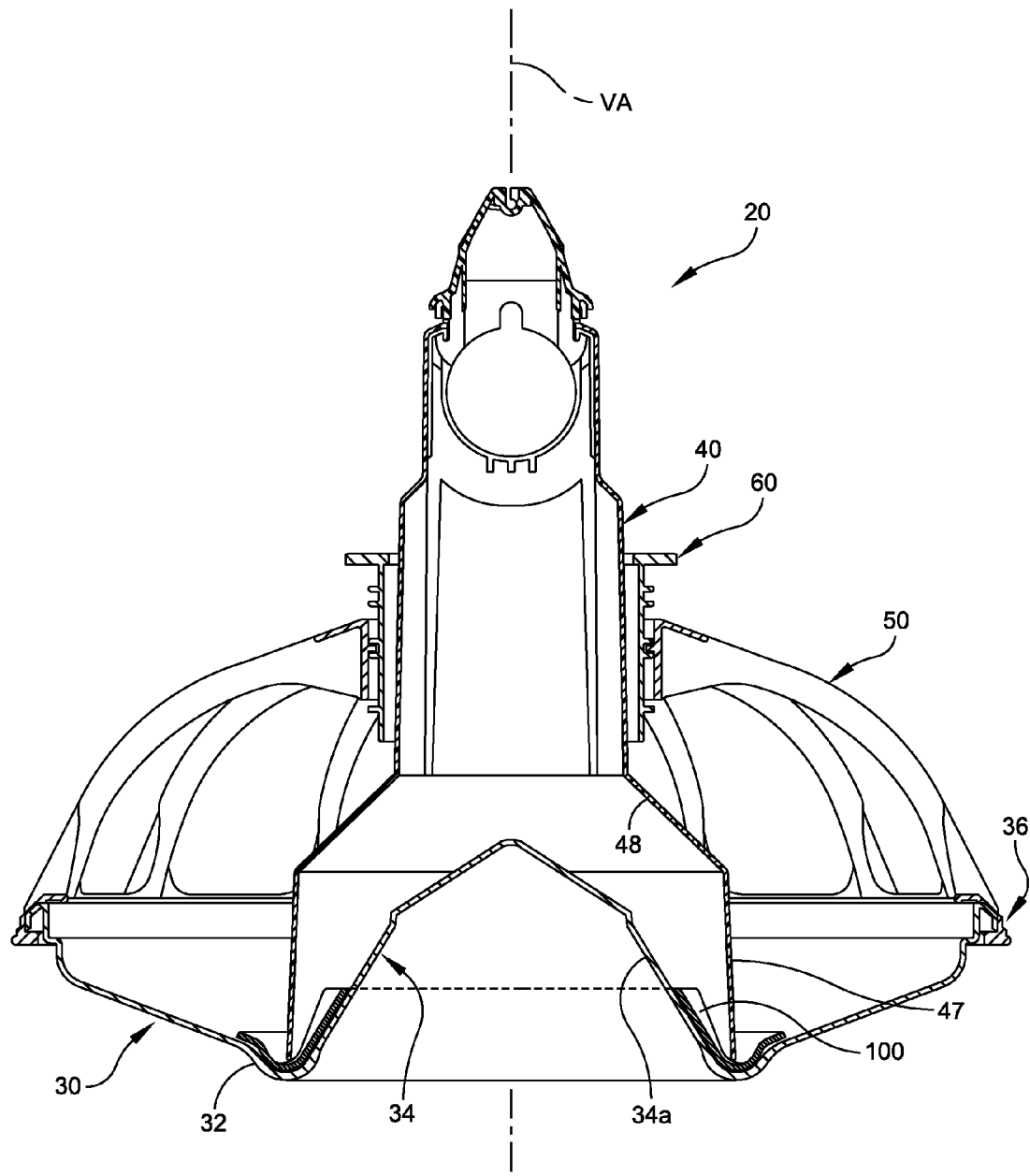
FIG. 14 is a cross-sectional side elevation view of the poultry feeder of FIG. 5 with a removably inserted beak grooming ring.

The open bottom and top ends 108, 109 preferably each define a corresponding aperture 110, 111 respectively with a diameter larger than the diameter of the top part of central bowl portion 34 of feeder pan 30 to allow the ring 100 to be inserted and slipped over the feeder pan (see, e.g. FIG. 14). Apertures 110, 111 and passageway 105 are concentrically aligned the central axis CA of the grooming ring 100. In more preferred embodiments, as shown in FIGS. 8 and 9, aperture 110 is larger than aperture 111 to conform to the configuration and diameters of the central bowl portion 34 of feeder pan 30 that lie adjacent to the apertures when the grooming ring 100 is mounted in feeder 20.

In one embodiment, as shown in FIGS. 8 and 9, grooming ring 100 preferably may have a circumferentially continuous annular body for strength and stability.

As shown in FIGS. 8 and 9, center section 101 of grooming ring 100 depends from concave bowl section 102 and extends in an upwards direction. Center section preferably has a shape that complements the shape of the center portion 34 of feeder pan 30. In one embodiment where center portion 34 may be conically shaped, center section 101 of grooming ring 100 may have a truncated frusto-conical shape as shown that complements the corresponding shape of the central portion of feeder pan 30 over which the ring 100 may be slipped (see, e.g. FIG. 14). In other embodiments contemplated where the feeder pan may have a differently configured center portion including portions that are vertical or a more shallow cone as non-limiting examples, the center section 101 may be correspondingly configured to complement those different shapes. Accordingly, the shape of center section 101 is not limited to frusto-conical shapes alone.

In one possible embodiment, as shown in FIGS. 8 and 9, the vertical height of center section 101 may be less than the vertical height of grooming ring 100 measured to the annular edge rim 107. In addition, the vertical height of center section 101 of grooming ring 100 may be less than the vertical height of central portion 34 of the feeder pan 30 since the poultry cannot generally access the upper part of the portion 34 when feeding due to the feeder tower 40 which covers the central portion 34, as shown in FIG. 14. Accordingly, center section 101 of grooming ring 100 need only have a height sufficient to cover the exposed portions of central portion 34 of the feeder pan 30.

In some embodiments, the outer surface 113 on the center section 101 of grooming ring 100 may include a plurality of circumferentially spaced apart, radially protruding division walls 104. Walls 104 separate the ring into individual feed troughs to minimize the birds from cross feeding from adjacent troughs. In one possible embodiment, center section 101 may be castellated and the walls 104 may include a broadened flat face 106 which faces radially outwards away from the ring 100 to form a surface on which the birds may peck to abrade their beaks.

Figure 15:
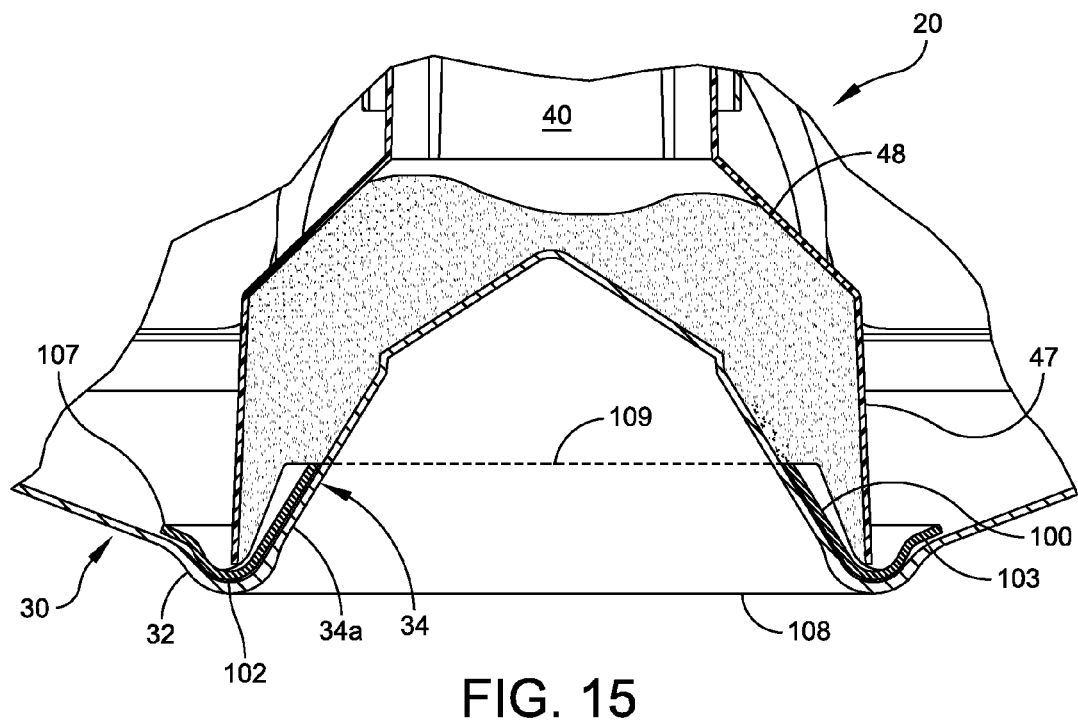
FIG. 15 is a detailed view taken from FIG. 14 showing the feeder in a closed position.
Figure 16:
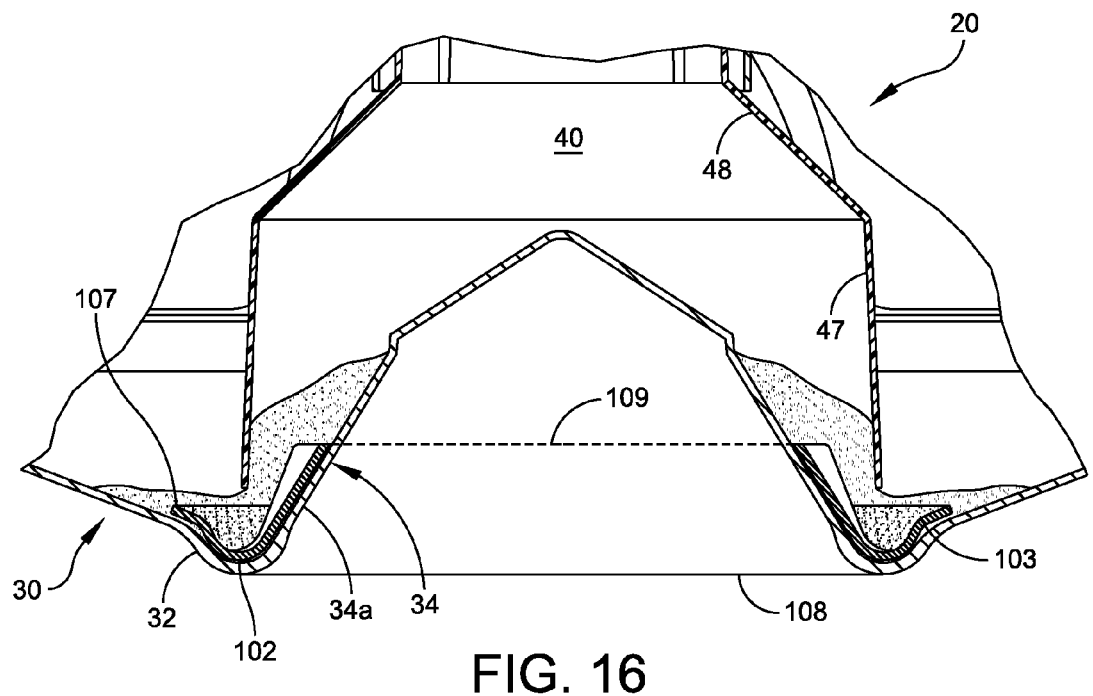
FIG. 16 is a detailed view taken from FIG. 14 showing the feeder in an open feed dispensing position.

Referring to FIGS. 8, 9, and 14-16, beak grooming ring 100 preferably has an annular shape that is complementary configured to a corresponding shape of a portion of the feeder pan 30 onto which the ring is to be placed. As shown in FIGS. 14-16, the grooming ring 100 has an inner surface 112 that in some embodiments preferably closely conforms to and complements the shape of the feeder pan 30 so that there is no appreciable gap between the grooming ring and pan. Advantageously, this removably positions and secures the separable grooming ring to the pan via the mating complementary geometric shapes of ring and pan without the need for adhesives, binders, or fasteners of any type. Gravity and the conforming fit between grooming ring 100 and feeder pan 30 hold the pan place. Removal and replacement of the grooming ring 100 is therefore greatly simplified and expeditiously performed in a minimal amount of time when and if needed for either periodically cleaning the feeders (e.g. by water hose) or to install new grooming rings. In addition, a system of various types of readily replaceable grooming rings 100 may be supplied so that the owner of a given poultry feeder model may select from rings of different material types and outer surface 113 configurations (e.g. division walls 104 (see, e.g. FIG. 8) based on personal preferences and requirements for a particular application. The configuration of the inner surface 112 of the grooming ring 100 will remain constant from ring-to-ring and preferably conforming to the shape of the feeder pan.

In the embodiment shown in FIGS. 8 and 9, grooming ring 100 may be made of a metal or metal alloy biologically compatible with poultry. Since the metal that is selected is preferably harder than the beak of a bird, the metal surface alone on which the birds peck and feed is sufficient to gradually abrade the beak and keep it trimmed thereby simulating the effect of natural free range feeding. A metal grooming ring 100 may be produced by any metal forming techniques commonly used in the art including stamping, casting, or other suitable fabrication techniques that are capable of producing the ring configurations shown. Since the grooming ring 100 is supported by feeder pan 30 and is not load bearing, relatively thin and inexpensive metals may be used for the ring. Suitable metals may include without limitation aluminum, steel (e.g. galvanized, stainless, etc.), and alloys thereof.

In some embodiments, a metal grooming ring 100 may be provided that has a relatively shiny or reflective outer surface 113 since it is generally known that shiny surfaces attract poultry. This may induce a pecking response from the birds which will abrade their beaks even in the absence of feeding or when the feed has been consumed.

In some embodiments, the outer surface 113 of a metal grooming ring 100 may further have a surface finish and roughness that enhances the abrasive properties of the grooming ring 100. Surface irregularities therefore will enhance the abrasive qualities of the grooming ring and may be desirable, but not necessary, within limits. A suitable roughness Ra (engineering profile roughness parameter representing the arithmetic average of absolute values of measured surface roughness in microinches) may be provided, which is well within the ambit of those skilled in the art to select and produce for grooming ring 100 to gradually and not excessively abrade away the beak. Suitable surface roughness may be produced by the grooming ring manufacturing and/or separate finishing operations used such as without limitation abrasive grinding and others. Various metal forming processes themselves such as molding and metal forming will produce a surface finish commensurate with the surface finish of the die used to produce the grooming ring.

In other embodiments, an appropriate surface texture of any suitable configuration may be produced by machining and/or metal forming processes to create surface patterns or features that function to increase the abrasive properties of the grooming ring 100. Such suitable surface textures may include surface features having various uniform or random configurations such as cross-hatching, spaced parallel or radial lines, random oriented raised and/or recesses shapes, etc.

In some embodiments, a metal grooming ring 100 may have a representative non-limiting thickness of $1/16$ or 0.0625 inches.

FIGS. 14-16 show grooming ring 100 positioned and installed in a poultry feeder, such as without limitation feeder 20 described herein. To install grooming ring 100, the grill assembly 50 is preferably removed from the feeder pan 30 to provide access to the conical central portion 34 and bowl portion 32 of the feeder. Grooming ring 100 is then slipped over central portion 34 which is received through passageway 105 of the ring (see also FIGS. 8 and 9). The grooming ring 100 is then guided downwards until the ring fully engages and becomes seated on the feeder pan 30, as shown.

When grooming ring 100 is fully seated on feeder pan 30 as shown in FIG. 14, the inner surface 112 on center section 101 of grooming ring 100 primarily engages the conical portion 34 of feeder pan 30, and the underside of concave bowl section 102 and outer peripheral section 103 of grooming ring 100 each engages the bowl portion 32 of the pan (see also FIGS. 8-9). Grooming ring 100 preferably extends radially inwards and upwards part way along angled walls 34a of cone shaped central portion 34 of feeder pan 30 and radially outwards over part of bowl portion 32 of the pan. Preferably, top end 109 of the ring 100 lies flat against and engages the mating portion of the angled walls 34a as shown to prevent feed from accumulating between the ring and feeder pan 30 portion 34. The grooming ring may extend outwards to cover more or less of bowl portion 32 of pan 30 than shown, but preferably covers at least the concave part of the portion 32 where the majority of feed resides. The grooming ring 100 is concentrically aligned with central portion 34 of feeder pan 30 and vertical axis VA of the feeder 20 once the feeder is fully assembled (see FIG. 14). Once the grooming ring 100 is securely in place, the grill assembly 50 may then be attached to the feeder pan 30 and the remaining portions of the feeder 20 may be assembled, to the extent necessary.

Grooming ring 100 is removed from feeder pan 30 by reversing the foregoing steps.

Figure 17:
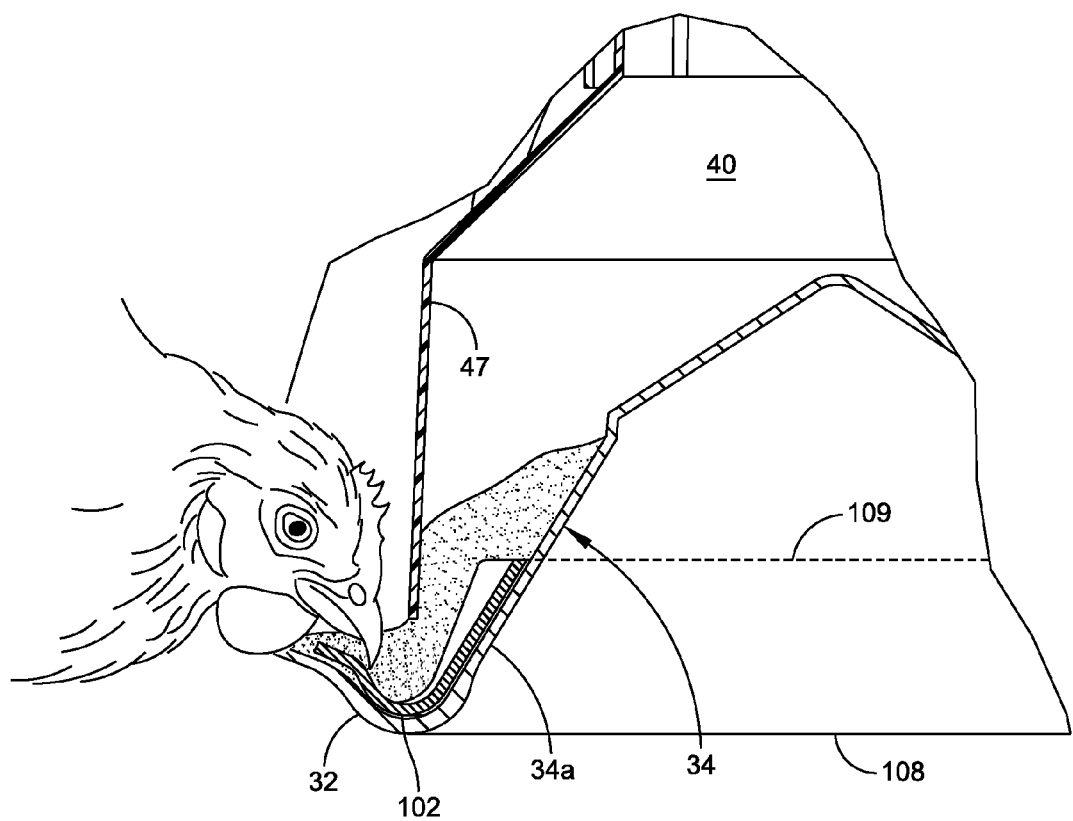
FIG. 17 is a detailed viewed thereof showing a bird feeding with beak engaging and being abraded by the beak grooming ring.
Figure 18:
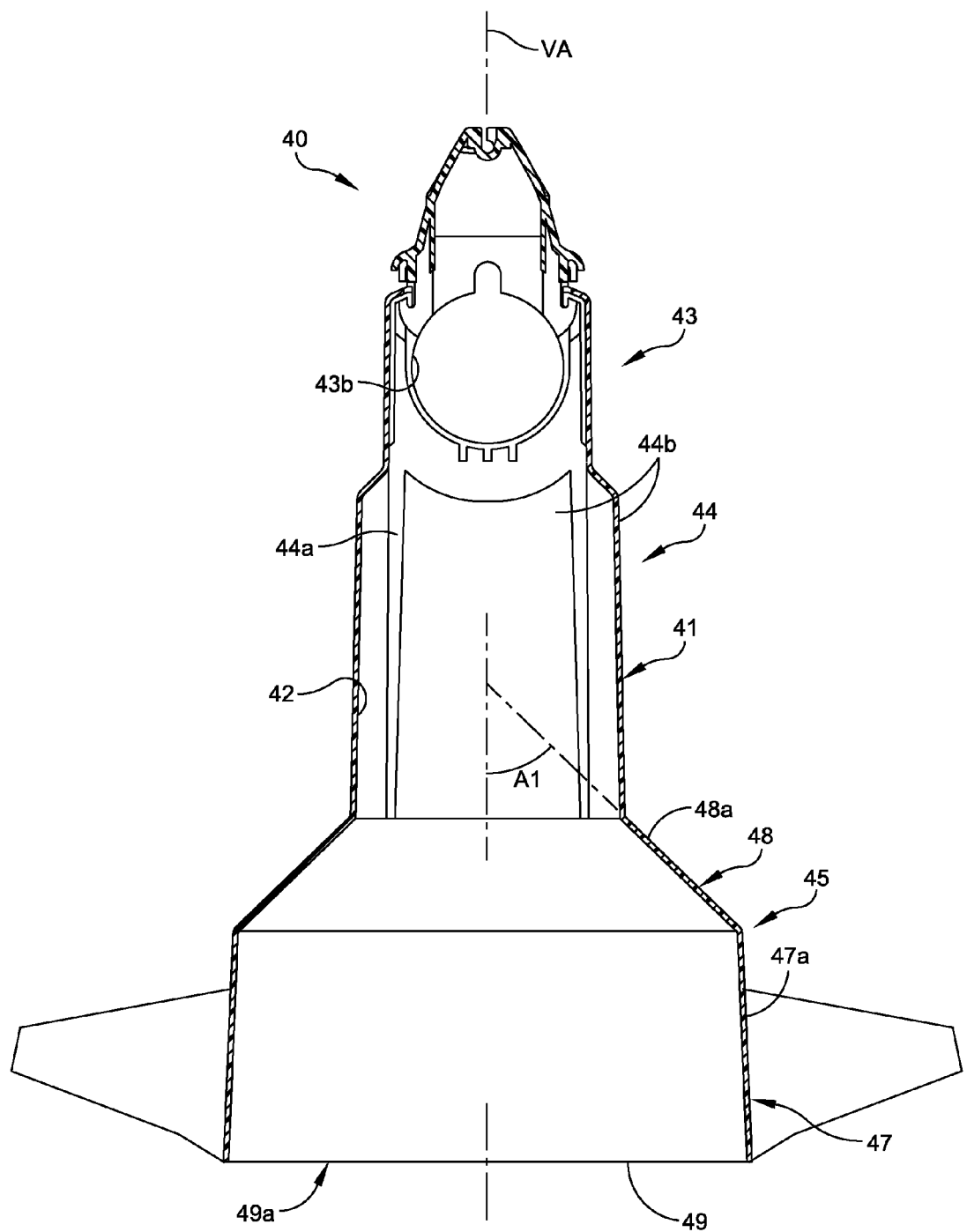
FIG. 18 is an alternative embodiment of the feeder tower of FIG. 4 having fins M as in FIG. 2B.

FIGS. 15-17 show beak grooming ring 100 in operation. FIG. 15 shows feeder 20 in a closed position with the feed (represented by stippling) being contained in the feeder tower 40. FIG. 16 shows feeder 20 in an open dispensing position in which the feed is free to flow by gravity into the concave bowl section 102 of grooming ring 100. The gap formed between the bottom of the feeder tower 40 and bowl section 102 sets the angle of repose and level to which the feed fills the grooming ring. FIG. 17 shows a bird feeding from grooming ring 100 which operably is abrading the beak to control its length as the beak grows.

Figure 10:
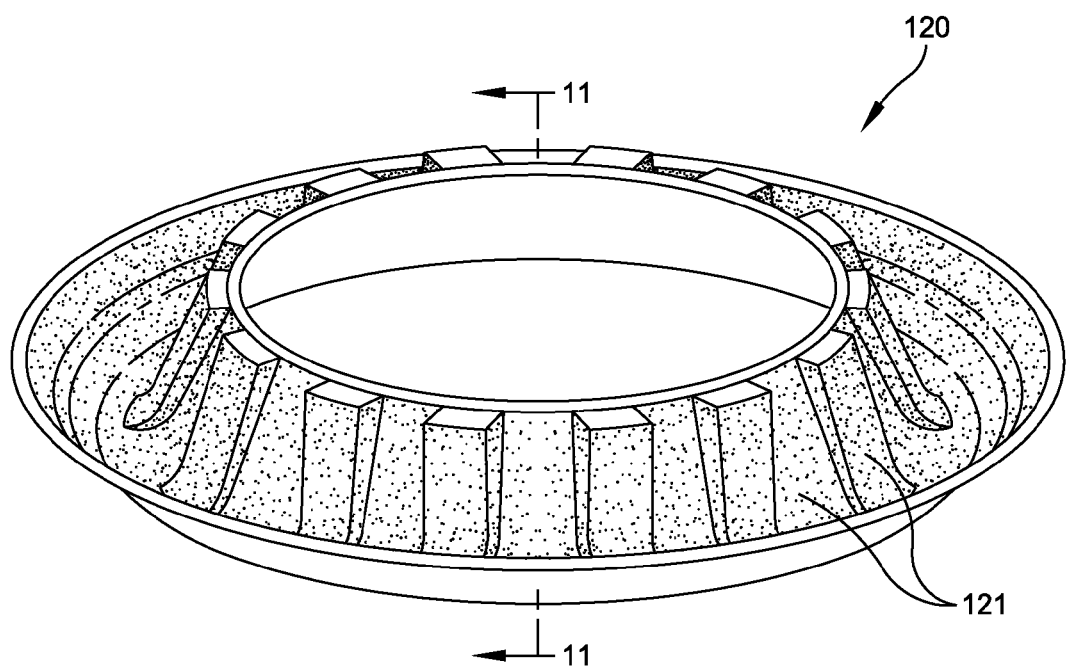
FIG. 10 is a perspective view of a second embodiment of a beak grooming ring that is removably insertable into the poultry feeder of FIG. 5 for controlling the growth of a birds beak while it feeds.
Figure 11:
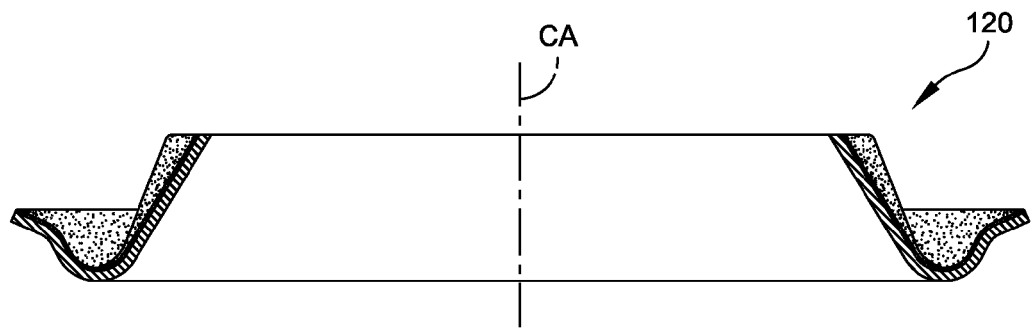
FIG. 11 is a cross-sectional side view thereof.

FIGS. 10 and 11 show an alternative embodiment of a beak grooming ring 120 similar in construction and configuration to grooming ring 100 (see FIGS. 8-9), but with an abrasive coating 121 applied to outer surface 113 of the ring to enhance beak abrading performance. The abrasive coating 121 may include abrasive particles of any suitable material, configuration, and size which may be adhered or bonded to the grooming ring 100 via a suitable means known in the art such as via an adhesive, epoxy, or other suitable binder. In some embodiments, without limitation, the abrasive particles may be crushed walnut shells, sand, or any other suitable particles that are biologically compatible and non-toxic if consumed by the poultry. Other suitable materials would include aluminum oxide, garnet, silicon carbide, or ceramic.

In the grooming ring 120 embodiment shown in FIGS. 10 and 11, the ring may be made of any suitable material capable of forming a semi-rigid or rigid self-supporting structure able to retain its shape independently of any support provided by the feeder pan 30 when placed thereon. Since the ring 120 in this embodiment serves only as a support for the topical applied abrasive coating 121, any biocompatible material may be used. Therefore, the hardness of the ring material as a base for the abrasive coating is not as crucial as the birds do not peck directly on the ring, but rather the abrasive coating. In some embodiments, grooming ring 120 may therefore be made inexpensively and an expendable component that may be discarded and replaced once the abrasive coating 121 has worn away. In some representative embodiments, for illustration without limitation, grooming ring 120 may be made of metal (as shown), polymer, resin impregnated compressed and cured cellulose fiber products, fiberglass, or any other suitable material capable of having a self-supporting structure. In embodiments where the grooming ring 120 is made by molding such as in the case of a polymer, the abrasive particles may be integrally co-molded into the ring by placing the particles in the mold and then overlaying the particles with polymer.

Figure 12:
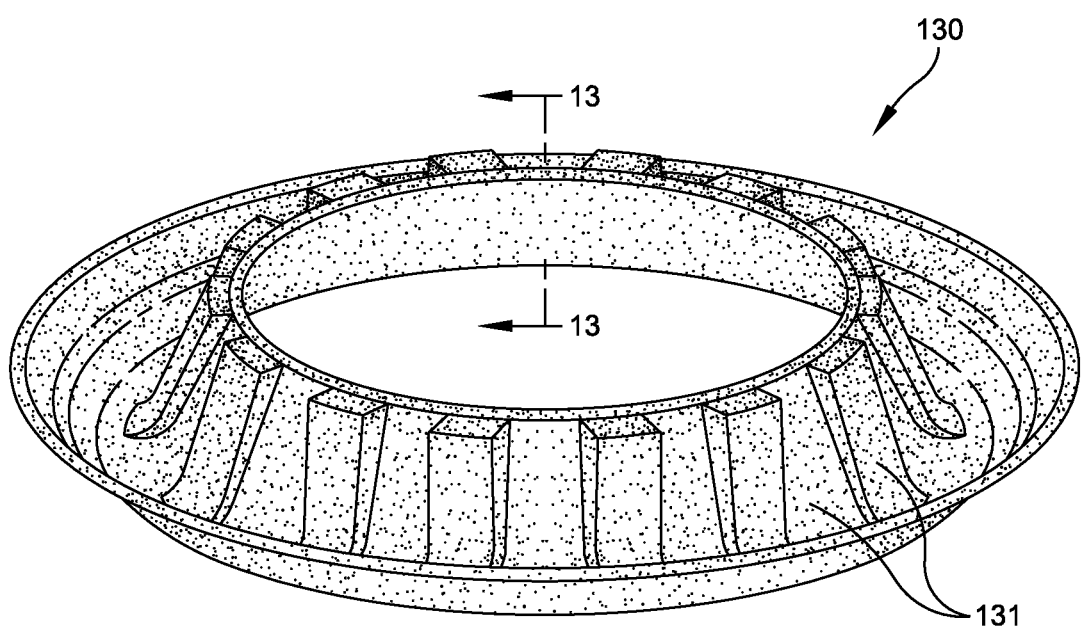
FIG. 12 is a perspective view of a third embodiment of a beak grooming ring that is removably insertable into the poultry feeder of FIG. 5 for controlling the growth of a birds beak while it feeds.
Figure 13:
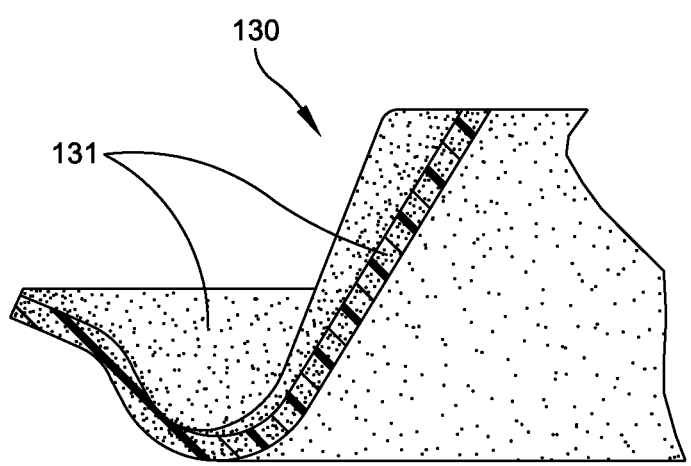
FIG. 13 is a cross-sectional side view thereof.

FIGS. 12 and 13 shown yet another alternative embodiment of a beak grooming ring 130 similar in construction and configuration to grooming ring 100 (see FIGS. 8-9), but with abrasive particles 131 interspersed throughout the entire body of the ring between the inner surface 112 and outer surface 113. The grooming ring 130 may be made of polymer in more preferred embodiments wherein the abrasive particles 131 may be mixed with the polymer prior to molding the grooming ring. Polymer grooming rings described herein, which will include any suitable plastics, may be made by any appropriate conventional forming process commonly used in the art such as injection molding and other methods.

It should be noted that the grooming rings 120 and 130 are held in place in feeder 20 in a similar manner to that shown in FIG. 14 by the complementary-configured geometries of grooming ring and feeder pan 30, without the use of adhesives or fasteners. Therefore, grooming ring 120 may be readily removed and replaced in the same manner as grooming ring 100.

In the foregoing description of grooming rings 120 and 130, reference should be made to FIGS. 8-9 and the discussion already provided herein for numerical designations and identification of portions of the ring which are not shown in duplicate again in FIGS. 10-13 for the sake of brevity, but identical to grooming ring 100.

All patents and published patent applications identified herein are incorporated herein by reference in their entireties.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes and/or control logic as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A poultry feeder with beak growth control device comprising:
    a feeder pan having a bowl portion configured for holding feed;
    a feeder tower positioned above the feeder pan and operable to receive and dispense feed into the feeder pan, the feeder tower having a bottom edge along its bottom end and configured to be raised and lowered between a raised position and a lowered position with respect to the feeder pan, wherein the raised position defining an open dispensing position for the poultry feeder and the lowered position defining a closed position for the poultry feeder; and
    a beak grooming ring having a concave bowl section and an outer surface, the beak grooming ring being a structure separate from the feeder tower and removably inserted in the poultry feeder and having an annular shape configured complementary to a corresponding shape of the feeder pan, the beak grooming ring fitting over and engaging the feeder pan, wherein the concave bowl section of the beak grooming ring engaging and covering the bowl portion of the feeder pan;
    wherein the complementary shapes of the beak grooming ring and the feeder pan hold the beak grooming ring in position on the feeder pan;
    wherein when the poultry feeder is in the closed position, the bottom edge of the feeder tower is seated and in contact with the beak grooming ring in the concave bowl section of the beak grooming ring thus containing the feed in the feeder tower and preventing the feed from flowing out of the feeder tower; and
    when the poultry feeder is in the open dispensing position, the bottom edge of the feeder tower is separated from and not in contact with the concave bowl section of the beak grooming ring while the beak grooming ring remains engaging and covering the bowl portion of the feeder pan and the feed is free to flow from the feeder tower into the concave bowl section of the beak grooming ring.

2. The feeder of claim 1, wherein the beak grooming ring has a rigid or semi-rigid self-supporting structure that retains its complementary shape to the feeder pan when removed from the feeder pan, the beak grooming ring being insertable and removable from feeder as a separable unit.

3. The feeder of claim 2, wherein the beak grooming ring is held in place without the use of adhesives or fasteners.

4. The feeder of claim 1, wherein the concave bowl section of the beak grooming ring mates with a complementary configured bowl portion of the feeder pan and the concave bowl section of the beak grooming ring operable to hold feed.

5. The feeder of claim 4, wherein the beak grooming ring includes an upwardly sloped frusto-conical center section having an open top end dimensioned slipping over a conical central portion of the feeder pan.

6. The feeder of claim 1, wherein the beak grooming ring engages the feeder pan from a top open end of the ring to a peripheral outer annular edge rim of the ring such that no appreciable gap exists between the ring and pan.

7. The feeder of claim 1, wherein the grooming ring is made of metal.

8. The feeder of claim 1, wherein the beak grooming ring includes an abrasive coating disposed to the outer surface of the beak grooming ring that is operable to abrade a beak.

9. The feeder of claim 8, wherein the beak grooming ring is made of a material selected from the group consisting of metal, polymer, resin impregnated compressed paper or wood fiber products, and fiberglass.

10. The feeder of claim 1, wherein the beak grooming ring has inner and outer surfaces defining a body of the grooming ring therebetween, and the grooming ring includes abrasive particles interspersed throughout the entire body of the beak grooming ring between inner and outer surfaces of the beak grooming ring.

11. The feeder of claim 10, wherein the beak grooming ring is made of polymer impregnated with abrasive particles.

12. The feeder of claim 1, wherein the outer surface of the beak grooming ring including circumferentially spaced apart division walls projecting radially outwards from the beak grooming ring.

13. The feeder of claim 1, wherein the concave bowl section of the beak grooming ring includes a U-shaped concave bowl section that mates with a complementary configured bowl portion of the feeder pan, the concave bowl section of the beak grooming ring operable to hold feed.

14. The feeder of claim 1, wherein the outer surface of the beak grooming ring is reflective.

* * * * *